US012254463B1

(12) United States Patent
Hecht et al.

(10) Patent No.: US 12,254,463 B1
(45) Date of Patent: Mar. 18, 2025

(54) BILLER DIRECTORY AND PAYMENTS ENGINE ARCHITECTURE

(71) Applicant: Wells Fargo Bank, N.A., San Francisco, CA (US)

(72) Inventors: Alan W. Hecht, San Francisco, CA (US); Sotirios Barkas, San Jose, CA (US); Ann M. Kirk, Deerwood, MN (US); Peter Rozovski, Concord, CA (US); Peter L. Shen, Castro Valley, CA (US); Chate Yap, Orinda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 37 days.

(21) Appl. No.: 16/555,934

(22) Filed: Aug. 29, 2019

Related U.S. Application Data

(60) Provisional application No. 62/787,073, filed on Dec. 31, 2018, provisional application No. 62/725,235, filed on Aug. 30, 2018.

(51) Int. Cl.
  *G06Q 30/04* (2012.01)
  *G06Q 20/02* (2012.01)
  *G06Q 20/36* (2012.01)

(52) U.S. Cl.
  CPC ....... *G06Q 20/3674* (2013.01); *G06Q 20/027* (2013.01); *G06Q 30/04* (2013.01)

(58) Field of Classification Search
  CPC .................................................... G06Q 30/04
  See application file for complete search history.

(56) References Cited

U.S. PATENT DOCUMENTS

| 5,412,192 A | 5/1995 | Hoss |
| 5,778,067 A | 7/1998 | Jones et al. |

(Continued)

FOREIGN PATENT DOCUMENTS

| JP | 2002-312554 A | 10/2002 | |
| KR | 20090014076 A | * 2/2009 | ............. G06Q 50/10 |

(Continued)

OTHER PUBLICATIONS

"Messages in the SCT interbank space—pacs.008 and pacs.002", Nov. 1, 2017, Paiementor, pp. 1-3 (Year: 2017).*

(Continued)

*Primary Examiner* — Hani M Kazimi
*Assistant Examiner* — Adam Hilmantel
(74) *Attorney, Agent, or Firm* — Foley & Lardner LLP

(57) ABSTRACT

A payer computing system includes a processing resource, a memory resource, and computer-executable instructions stored thereon and embodied in a customer-side application programming interface (API). The instructions, when executed by the processing resource, cause the payer computing system to receive an electronic payment request and, in response, generate a request (e.g., a first API message) to access a biller computing system using a previously generated payer electronic token. The request is transmitted to the biller computing system. The payer computing system receives (e.g., via a second API message) payment information provided by the biller computing system in response to the request to access. Based on payment information, the payer computing system generates a payment transaction and causes (e.g., via a third API message) the payment transaction to be initiated.

20 Claims, 19 Drawing Sheets

(56) References Cited

U.S. PATENT DOCUMENTS

| | | |
|---|---|---|
| 5,953,710 A | 9/1999 | Fleming |
| 6,016,484 A | 1/2000 | Williams et al. |
| 6,353,811 B1 | 3/2002 | Weissman |
| 6,615,194 B1 | 9/2003 | Deutsch et al. |
| 6,865,547 B1 | 3/2005 | Brake et al. |
| 6,873,974 B1 | 3/2005 | Schutzer |
| 6,993,510 B2 | 1/2006 | Guy et al. |
| 7,086,586 B1 | 8/2006 | Sullivan |
| 7,287,695 B2 | 10/2007 | Wankmueller |
| 7,395,243 B1 | 7/2008 | Zielke et al. |
| 7,398,919 B2 | 7/2008 | Cooper |
| 7,400,883 B2 | 7/2008 | Rivers et al. |
| 7,631,803 B2 | 12/2009 | Peyret et al. |
| 7,757,944 B2 | 7/2010 | Cline et al. |
| 7,774,274 B2 | 8/2010 | Jones et al. |
| 7,822,206 B2 | 10/2010 | Birk et al. |
| 7,827,057 B1 | 11/2010 | Walker et al. |
| 7,860,790 B2 | 12/2010 | Monk |
| 7,909,243 B2 | 3/2011 | Merkow et al. |
| 7,925,285 B2 | 4/2011 | Indirabhai |
| 7,930,225 B2 | 4/2011 | Wahlberg et al. |
| 7,945,776 B1 | 5/2011 | Atzmony et al. |
| 7,958,049 B2 | 6/2011 | Jamison et al. |
| 7,970,669 B1 | 6/2011 | Santos |
| 8,019,365 B2 | 9/2011 | Fisher |
| 8,078,140 B2 | 12/2011 | Baker et al. |
| 8,126,806 B1 | 2/2012 | Dimartino et al. |
| 8,160,959 B2 | 4/2012 | Rackley et al. |
| 8,215,560 B2 | 7/2012 | Granucci et al. |
| 8,266,058 B1 | 9/2012 | Anderson |
| 8,280,788 B2 | 10/2012 | Perlman |
| 8,401,904 B1 | 3/2013 | Simakov et al. |
| 8,433,657 B2 | 4/2013 | Dinan |
| 8,452,257 B2 | 5/2013 | Granucci et al. |
| 8,459,544 B2 | 6/2013 | Casey et al. |
| 8,467,766 B2 | 6/2013 | Rackley et al. |
| 8,468,587 B2 | 6/2013 | Blinn et al. |
| 8,489,067 B2 | 7/2013 | Rackley, III et al. |
| 8,504,699 B2 | 8/2013 | Vaughan et al. |
| 8,533,123 B2 | 9/2013 | Hart |
| 8,538,845 B2 | 9/2013 | Liberty |
| 8,548,908 B2 | 10/2013 | Friedman |
| 8,555,361 B2 | 10/2013 | Nakhjiri et al. |
| 8,566,237 B2 | 10/2013 | Forzley |
| 8,566,239 B2 | 10/2013 | Arthur et al. |
| 8,571,953 B2 | 10/2013 | Gopalakrishnan et al. |
| 8,589,290 B2 | 11/2013 | Baskerville |
| 8,615,468 B2 | 12/2013 | Varadarajan |
| 8,626,632 B1 | 1/2014 | Dolan et al. |
| 8,627,424 B1 | 1/2014 | O'Malley et al. |
| 8,635,131 B1 | 1/2014 | Saunders |
| 8,639,621 B1 | 1/2014 | Ellis et al. |
| 8,645,971 B2 | 2/2014 | Carlson et al. |
| 8,676,704 B2 | 3/2014 | Ledbetter et al. |
| 8,682,802 B1 | 3/2014 | Kannanari |
| 8,700,729 B2 | 4/2014 | Dua |
| 8,706,628 B2 | 4/2014 | Phillips |
| 8,725,576 B2 | 5/2014 | Fisher |
| 8,725,577 B2 | 5/2014 | Fisher |
| 8,732,080 B2 | 5/2014 | Karim |
| 8,744,966 B1 | 6/2014 | Amacker et al. |
| 8,750,901 B1 | 6/2014 | Gupta et al. |
| 8,762,265 B2 | 6/2014 | Kessler et al. |
| 8,762,270 B2 | 6/2014 | Evans et al. |
| 8,768,830 B1 | 7/2014 | Jorgensen et al. |
| 8,768,834 B2 | 7/2014 | Zacarias et al. |
| 8,774,781 B1 | 7/2014 | Speiser et al. |
| 8,781,955 B2 | 7/2014 | Schamer et al. |
| 8,831,677 B2 | 9/2014 | Villa-Real |
| 8,838,501 B1 | 9/2014 | Priebatsch |
| 8,843,125 B2 | 9/2014 | Kwon et al. |
| 8,843,417 B2 | 9/2014 | Hammad |
| 8,880,432 B2 | 11/2014 | Collins, Jr. |
| 8,924,246 B1 | 12/2014 | Chen et al. |
| 8,925,805 B2 | 1/2015 | Grigg et al. |
| 8,930,271 B1 | 1/2015 | Ellis et al. |
| 8,972,297 B2 | 3/2015 | Kay et al. |
| 8,977,251 B2 | 3/2015 | Grigg et al. |
| 8,989,712 B2 | 3/2015 | Wentker et al. |
| 9,020,836 B2 | 4/2015 | Fisher et al. |
| 9,026,460 B2 | 5/2015 | Grigg et al. |
| 9,027,109 B2 | 5/2015 | Wolberg-Stok et al. |
| 9,031,880 B2 | 5/2015 | Bishop et al. |
| 9,037,509 B1 | 5/2015 | Ellis et al. |
| 9,043,240 B2 | 5/2015 | Langus et al. |
| 9,043,605 B1 | 5/2015 | Machani |
| 9,098,190 B2 | 8/2015 | Zhou et al. |
| 9,111,266 B2 | 8/2015 | Kessler et al. |
| 9,117,242 B1 | 8/2015 | Ellis et al. |
| 9,177,307 B2 | 11/2015 | Ross et al. |
| 9,208,488 B2 | 12/2015 | Liberty |
| 9,208,528 B2 | 12/2015 | Chelst et al. |
| 9,218,624 B2 | 12/2015 | Moghadam |
| 9,256,876 B2 | 2/2016 | Vasant Akole et al. |
| 9,286,606 B2 | 3/2016 | Diamond |
| 9,324,068 B2 | 4/2016 | Soundararajan |
| 9,361,616 B2 | 6/2016 | Zhou et al. |
| 9,424,572 B2 | 8/2016 | Bondesen et al. |
| 9,473,491 B1 | 10/2016 | Johansson et al. |
| 9,652,770 B1 | 5/2017 | Kurani et al. |
| 9,659,312 B1 | 5/2017 | Ellis et al. |
| 9,691,058 B2 | 6/2017 | Epler et al. |
| 9,704,157 B1 | 7/2017 | Ellis et al. |
| 9,741,051 B2 | 8/2017 | Carpenter et al. |
| 9,785,934 B2 | 10/2017 | Davis et al. |
| 9,805,363 B1 | 10/2017 | Rudnick et al. |
| 9,818,109 B2 | 11/2017 | Loh |
| 9,928,518 B1 | 3/2018 | Vippagunta et al. |
| 9,972,047 B1 | 5/2018 | Elliott et al. |
| 10,019,740 B2 | 7/2018 | Simantov et al. |
| 10,037,561 B1 | 7/2018 | Hecht |
| 10,115,112 B2 | 10/2018 | Fordyce, III |
| 10,121,129 B2 | 11/2018 | Kalgi |
| 10,223,710 B2 | 3/2019 | Purves et al. |
| 10,235,668 B1 | 3/2019 | Ellis et al. |
| 10,242,368 B1* | 3/2019 | Poole ............... G06Q 20/405 |
| 10,380,583 B1 | 8/2019 | Ellis et al. |
| 10,380,596 B1 | 8/2019 | Butler et al. |
| 10,395,247 B2 | 8/2019 | Gilliam et al. |
| 10,402,897 B1 | 9/2019 | Czyzewski et al. |
| 10,445,739 B1 | 10/2019 | Sahni et al. |
| 10,467,615 B1 | 11/2019 | Omojola et al. |
| 10,515,356 B2 | 12/2019 | Cronic et al. |
| 10,565,558 B2 | 2/2020 | Fredericks et al. |
| 10,586,236 B2 | 3/2020 | Pourfallah et al. |
| 10,600,128 B2 | 3/2020 | Graham et al. |
| 10,817,950 B1 | 10/2020 | Iqbal et al. |
| 10,853,787 B1 | 12/2020 | Mango |
| 10,887,301 B1* | 1/2021 | Vera ............... H04L 9/3239 |
| 10,997,592 B1 | 5/2021 | Kurani |
| 11,042,882 B2 | 6/2021 | Ledford et al. |
| 11,068,866 B1 | 7/2021 | Hecht et al. |
| 11,113,695 B2 | 9/2021 | Shah et al. |
| 11,144,902 B2 | 10/2021 | Gaddam et al. |
| 11,151,546 B2 | 10/2021 | Mossoba et al. |
| 11,210,715 B2 | 12/2021 | Lindsey et al. |
| 11,227,064 B1 | 1/2022 | Fakhraie et al. |
| 11,228,660 B2 | 1/2022 | Rapaka et al. |
| 11,270,293 B2 | 3/2022 | Salama et al. |
| 11,288,660 B1 | 3/2022 | Kurani |
| 11,295,294 B1 | 4/2022 | Kurani et al. |
| 11,334,579 B1 | 5/2022 | Quade et al. |
| 11,416,766 B2 | 8/2022 | Chao et al. |
| 11,422,393 B2 | 8/2022 | Stray et al. |
| 11,436,581 B1 | 9/2022 | Walker et al. |
| 11,551,190 B1 | 1/2023 | Clements et al. |
| 11,682,005 B2 | 6/2023 | Hunter et al. |
| 2002/0032602 A1 | 3/2002 | Lanzillo et al. |
| 2002/0052852 A1 | 5/2002 | Bozeman |
| 2002/0062249 A1 | 5/2002 | Iannacci |
| 2002/0095386 A1 | 7/2002 | Maritzen et al. |
| 2002/0174016 A1 | 11/2002 | Cuervo |
| 2002/0198829 A1 | 12/2002 | Ludwig et al. |
| 2003/0028481 A1 | 2/2003 | Flitcroft et al. |

(56) References Cited

U.S. PATENT DOCUMENTS

| | | |
|---|---|---|
| 2003/0040964 A1 | 2/2003 | Lacek |
| 2003/0055785 A1 | 3/2003 | Lahiri |
| 2003/0056096 A1 | 3/2003 | Albert et al. |
| 2003/0172039 A1 | 9/2003 | Guy et al. |
| 2004/0088349 A1 | 5/2004 | Beck et al. |
| 2004/0230535 A1 | 11/2004 | Binder et al. |
| 2004/0236632 A1 | 11/2004 | Maritzen et al. |
| 2004/0254848 A1 | 12/2004 | Golan et al. |
| 2004/0260646 A1 | 12/2004 | Berardi et al. |
| 2005/0021401 A1 | 1/2005 | Postrel |
| 2005/0021457 A1 | 1/2005 | Johnson et al. |
| 2005/0043997 A1 | 2/2005 | Sahota et al. |
| 2005/0077350 A1 | 4/2005 | Courtion et al. |
| 2005/0086492 A1 | 4/2005 | Nicodemus et al. |
| 2005/0125317 A1 | 6/2005 | Winkelman et al. |
| 2005/0125668 A1 | 6/2005 | Botz |
| 2005/0133590 A1 | 6/2005 | Rettenmyer et al. |
| 2005/0138377 A1 | 6/2005 | First et al. |
| 2005/0184145 A1 | 8/2005 | Law et al. |
| 2005/0235363 A1 | 10/2005 | Hibbard et al. |
| 2006/0129502 A1 | 6/2006 | Pastusiak et al. |
| 2006/0229985 A1 | 10/2006 | Lalwani et al. |
| 2006/0253335 A1 | 11/2006 | Keena et al. |
| 2007/0125840 A1* | 6/2007 | Law ............... G06Q 20/363 705/65 |
| 2007/0162369 A1 | 7/2007 | Hardison |
| 2007/0168354 A1 | 7/2007 | Ramer et al. |
| 2007/0170243 A1 | 7/2007 | Desany et al. |
| 2007/0174166 A1 | 7/2007 | Jones |
| 2007/0174873 A1 | 7/2007 | Griggs |
| 2007/0198432 A1 | 8/2007 | Pitroda |
| 2007/0244811 A1 | 10/2007 | Tumminaro |
| 2007/0250923 A1 | 10/2007 | M'Raihi |
| 2007/0262140 A1 | 11/2007 | Long |
| 2008/0006685 A1 | 1/2008 | Rackley III et al. |
| 2008/0033878 A1 | 2/2008 | Krikorian et al. |
| 2008/0127317 A1 | 5/2008 | Nakhjiri |
| 2008/0134295 A1 | 6/2008 | Bailey et al. |
| 2008/0203152 A1 | 8/2008 | Hammad et al. |
| 2008/0208742 A1 | 8/2008 | Arthur et al. |
| 2008/0242274 A1 | 10/2008 | Swanburg et al. |
| 2008/0294556 A1 | 11/2008 | Anderson |
| 2008/0319887 A1 | 12/2008 | Pizzi et al. |
| 2009/0027191 A1 | 1/2009 | Farah et al. |
| 2009/0043695 A1 | 2/2009 | Hickey |
| 2009/0048971 A1 | 2/2009 | Hathaway et al. |
| 2009/0063178 A1 | 3/2009 | Pousti et al. |
| 2009/0076950 A1* | 3/2009 | Chang ............. G06Q 40/00 705/40 |
| 2009/0106558 A1 | 4/2009 | Delgrosso et al. |
| 2009/0157531 A1 | 6/2009 | Bui |
| 2009/0177563 A1 | 7/2009 | Bernstein et al. |
| 2009/0192873 A1 | 7/2009 | Marble |
| 2009/0271287 A1 | 10/2009 | Halpern |
| 2009/0281941 A1 | 11/2009 | Worth |
| 2009/0281951 A1 | 11/2009 | Shakkarwar |
| 2009/0319409 A1 | 12/2009 | Omidyar |
| 2009/0319427 A1 | 12/2009 | Gardner et al. |
| 2009/0327010 A1 | 12/2009 | Vadhri |
| 2009/0327151 A1 | 12/2009 | Carlson et al. |
| 2010/0057553 A1 | 3/2010 | Ameiss et al. |
| 2010/0063906 A1 | 3/2010 | Nelsen et al. |
| 2010/0076833 A1 | 3/2010 | Nelsen |
| 2010/0088188 A1 | 4/2010 | Kumar et al. |
| 2010/0114724 A1 | 5/2010 | Ghosh et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0125510 A1 | 5/2010 | Smith et al. |
| 2010/0131415 A1 | 5/2010 | Sartipi |
| 2010/0191602 A1 | 7/2010 | Mikkelsen et al. |
| 2010/0205077 A1 | 8/2010 | Hammad |
| 2010/0274655 A1 | 10/2010 | Postrel |
| 2010/0280896 A1 | 11/2010 | Postrel |
| 2010/0325048 A1 | 12/2010 | Carlson et al. |
| 2010/0332386 A1 | 12/2010 | Vancini et al. |
| 2011/0055080 A1 | 3/2011 | Ahlers et al. |
| 2011/0071914 A1 | 3/2011 | Beasley et al. |
| 2011/0106601 A1 | 5/2011 | Perlman et al. |
| 2011/0106674 A1 | 5/2011 | Perlman |
| 2011/0137797 A1 | 6/2011 | Stals et al. |
| 2011/0153397 A1 | 6/2011 | Wagenheim |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270665 A1 | 11/2011 | Kim et al. |
| 2011/0270748 A1 | 11/2011 | Graham et al. |
| 2011/0270749 A1 | 11/2011 | Bennett et al. |
| 2011/0276489 A1 | 11/2011 | Larkin |
| 2011/0289004 A1 | 11/2011 | Prakash et al. |
| 2011/0295748 A1 | 12/2011 | Woodriffe |
| 2011/0295749 A1 | 12/2011 | Scalisi |
| 2011/0313918 A1 | 12/2011 | Lawson et al. |
| 2011/0320344 A1 | 12/2011 | Faith et al. |
| 2012/0011063 A1 | 1/2012 | Killian et al. |
| 2012/0018511 A1 | 1/2012 | Hammad |
| 2012/0078735 A1 | 3/2012 | Bauer et al. |
| 2012/0078751 A1 | 3/2012 | Macphail et al. |
| 2012/0084210 A1 | 4/2012 | Farahmand |
| 2012/0110634 A1 | 5/2012 | Jakobsson |
| 2012/0130731 A1 | 5/2012 | Canetto |
| 2012/0130887 A1 | 5/2012 | Meckling |
| 2012/0143705 A1 | 6/2012 | Bhattacharya et al. |
| 2012/0150687 A1 | 6/2012 | Hart |
| 2012/0158589 A1 | 6/2012 | Katzin et al. |
| 2012/0185317 A1 | 7/2012 | Wong |
| 2012/0185387 A1 | 7/2012 | Doyle |
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1 | 8/2012 | Hammad et al. |
| 2012/0233005 A1 | 9/2012 | White |
| 2012/0239417 A1 | 9/2012 | Pourfallah et al. |
| 2012/0253852 A1 | 10/2012 | Pourfallah et al. |
| 2012/0253913 A1 | 10/2012 | Richard |
| 2012/0254021 A1 | 10/2012 | Wohied et al. |
| 2012/0271712 A1 | 10/2012 | Katzin et al. |
| 2012/0284130 A1 | 11/2012 | Lewis et al. |
| 2012/0284195 A1 | 11/2012 | Mcmillen et al. |
| 2012/0290376 A1 | 11/2012 | Dryer et al. |
| 2012/0296720 A1 | 11/2012 | Pirillo |
| 2012/0301774 A1 | 11/2012 | Jiang et al. |
| 2012/0303425 A1 | 11/2012 | Katzin et al. |
| 2012/0310774 A1 | 12/2012 | Chassin |
| 2012/0323717 A1 | 12/2012 | Kirsch |
| 2012/0323762 A1 | 12/2012 | Kapur et al. |
| 2012/0330837 A1 | 12/2012 | Persaud et al. |
| 2013/0006848 A1 | 1/2013 | Kuttuva |
| 2013/0013509 A1 | 1/2013 | Perlman et al. |
| 2013/0018777 A1 | 1/2013 | Klein |
| 2013/0018786 A1* | 1/2013 | Sher ............... G06Q 40/02 705/40 |
| 2013/0018791 A1 | 1/2013 | Mendicino et al. |
| 2013/0018792 A1 | 1/2013 | Casey et al. |
| 2013/0024364 A1 | 1/2013 | Shrivastava et al. |
| 2013/0030941 A1 | 1/2013 | Meredith et al. |
| 2013/0042261 A1 | 2/2013 | Tavormina et al. |
| 2013/0054336 A1 | 2/2013 | Graylin |
| 2013/0054454 A1 | 2/2013 | Purves et al. |
| 2013/0054469 A1 | 2/2013 | Agashe et al. |
| 2013/0060679 A1 | 3/2013 | Oskolkov et al. |
| 2013/0060689 A1 | 3/2013 | Oskolkov et al. |
| 2013/0060696 A1 | 3/2013 | Martin et al. |
| 2013/0060708 A1 | 3/2013 | Oskolkov et al. |
| 2013/0065555 A1 | 3/2013 | Baker et al. |
| 2013/0073365 A1 | 3/2013 | Mccarthy |
| 2013/0073459 A1 | 3/2013 | Zacarias et al. |
| 2013/0074168 A1 | 3/2013 | Hao et al. |
| 2013/0080241 A1 | 3/2013 | Fisher |
| 2013/0080323 A1 | 3/2013 | Scipioni |
| 2013/0110628 A1 | 5/2013 | Yeo et al. |
| 2013/0110658 A1 | 5/2013 | Lyman et al. |
| 2013/0132275 A1 | 5/2013 | Enzaldo et al. |
| 2013/0132854 A1 | 5/2013 | Raleigh et al. |

(56) References Cited

U.S. PATENT DOCUMENTS

| | | |
|---|---|---|
| 2013/0143089 A1 | 6/2013 | Teshima et al. |
| 2013/0144663 A1 | 6/2013 | Qawami et al. |
| 2013/0144702 A1 | 6/2013 | Tabor et al. |
| 2013/0151400 A1 | 6/2013 | Makhotin et al. |
| 2013/0166332 A1 | 6/2013 | Hammad |
| 2013/0168450 A1 | 7/2013 | Von Mueller et al. |
| 2013/0173456 A1 | 7/2013 | Grigg et al. |
| 2013/0173474 A1 | 7/2013 | Ranganathan et al. |
| 2013/0179336 A1 | 7/2013 | Lyons et al. |
| 2013/0179352 A1 | 7/2013 | Dwyre et al. |
| 2013/0185167 A1 | 7/2013 | Mestre et al. |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226720 A1 | 8/2013 | Ahluwalia et al. |
| 2013/0226751 A1 | 8/2013 | Friedholm et al. |
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246258 A1 | 9/2013 | Dessert |
| 2013/0246260 A1 | 9/2013 | Barten et al. |
| 2013/0246261 A1 | 9/2013 | Purves et al. |
| 2013/0246265 A1 | 9/2013 | Al-Sahli |
| 2013/0254028 A1 | 9/2013 | Salci |
| 2013/0254102 A1 | 9/2013 | Royyuru |
| 2013/0254114 A1 | 9/2013 | Smith |
| 2013/0254115 A1 | 9/2013 | Pasa et al. |
| 2013/0260734 A1 | 10/2013 | Jain et al. |
| 2013/0262309 A1 | 10/2013 | Gadotti |
| 2013/0262316 A1 | 10/2013 | Hruska |
| 2013/0262317 A1 | 10/2013 | Collinge et al. |
| 2013/0275250 A1 | 10/2013 | Rodell et al. |
| 2013/0290121 A1 | 10/2013 | Simakov et al. |
| 2013/0290169 A1 | 10/2013 | Bathula et al. |
| 2013/0290176 A1 | 10/2013 | Tirumalashetty |
| 2013/0297425 A1 | 11/2013 | Wallaja |
| 2013/0297486 A1 | 11/2013 | Colborn |
| 2013/0297513 A1 | 11/2013 | Kirillin et al. |
| 2013/0304559 A1 | 11/2013 | Stone et al. |
| 2013/0304642 A1 | 11/2013 | Campos |
| 2013/0317928 A1 | 11/2013 | Laracey |
| 2013/0332344 A1 | 12/2013 | Weber |
| 2013/0346302 A1* | 12/2013 | Purves ............... G06Q 20/102 705/40 |
| 2014/0006129 A1 | 1/2014 | Heath |
| 2014/0006194 A1 | 1/2014 | Xie et al. |
| 2014/0006276 A1 | 1/2014 | Grigg et al. |
| 2014/0006277 A1 | 1/2014 | Rao |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0040139 A1 | 2/2014 | Brudnicki et al. |
| 2014/0052617 A1* | 2/2014 | Chawla ............... G06Q 20/102 705/39 |
| 2014/0058855 A1 | 2/2014 | Hussein et al. |
| 2014/0058936 A1 | 2/2014 | Ren et al. |
| 2014/0058938 A1 | 2/2014 | Mcclung, III |
| 2014/0067677 A1 | 3/2014 | Ali et al. |
| 2014/0074581 A1 | 3/2014 | Johnson et al. |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0089195 A1 | 3/2014 | Ward et al. |
| 2014/0096215 A1 | 4/2014 | Hessler |
| 2014/0100975 A1 | 4/2014 | Van |
| 2014/0101034 A1 | 4/2014 | Tanner et al. |
| 2014/0101048 A1 | 4/2014 | Gardiner et al. |
| 2014/0108254 A1 | 4/2014 | Lee |
| 2014/0109200 A1 | 4/2014 | Tootill et al. |
| 2014/0114856 A1 | 4/2014 | Jung et al. |
| 2014/0118704 A1 | 5/2014 | Duelli et al. |
| 2014/0122310 A1 | 5/2014 | Torrens et al. |
| 2014/0122563 A1 | 5/2014 | Singh et al. |
| 2014/0129357 A1 | 5/2014 | Goodwin |
| 2014/0129433 A1 | 5/2014 | Rosenberger |
| 2014/0136352 A1 | 5/2014 | Ramakrishna et al. |
| 2014/0143089 A1 | 5/2014 | Campos et al. |
| 2014/0188586 A1 | 7/2014 | Carpenter et al. |
| 2014/0188704 A1 | 7/2014 | Grossman et al. |
| 2014/0188718 A1 | 7/2014 | Grossman et al. |
| 2014/0188719 A1 | 7/2014 | Poornachandran et al. |
| 2014/0201086 A1 | 7/2014 | Gadotti et al. |
| 2014/0207680 A1 | 7/2014 | Rephlo |
| 2014/0210321 A1 | 7/2014 | Dixon |
| 2014/0214640 A1 | 7/2014 | Mallikarjunan et al. |
| 2014/0222670 A1 | 8/2014 | Concannon |
| 2014/0236792 A1 | 8/2014 | Pant et al. |
| 2014/0244506 A1 | 8/2014 | Gramling |
| 2014/0250003 A1 | 9/2014 | Levchin et al. |
| 2014/0258135 A1 | 9/2014 | Park et al. |
| 2014/0279097 A1 | 9/2014 | Alshobaki et al. |
| 2014/0279459 A1 | 9/2014 | Weiss et al. |
| 2014/0279469 A1 | 9/2014 | Mendes |
| 2014/0279559 A1 | 9/2014 | Smith et al. |
| 2014/0279566 A1 | 9/2014 | Verma et al. |
| 2014/0282068 A1 | 9/2014 | Levkovitz et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0304187 A1 | 10/2014 | Menn |
| 2014/0310173 A1 | 10/2014 | Caldwell |
| 2014/0310182 A1 | 10/2014 | Cummins |
| 2014/0337175 A1 | 11/2014 | Katzin et al. |
| 2014/0337621 A1 | 11/2014 | Nakhimov |
| 2014/0344153 A1 | 11/2014 | Raj et al. |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365322 A1 | 12/2014 | Phillips |
| 2014/0365363 A1 | 12/2014 | Knudsen et al. |
| 2014/0376576 A1 | 12/2014 | Jespersen et al. |
| 2014/0379576 A1 | 12/2014 | Marx et al. |
| 2015/0019944 A1 | 1/2015 | Kalgi |
| 2015/0025464 A1 | 1/2015 | McTaggart et al. |
| 2015/0026049 A1 | 1/2015 | Theurer et al. |
| 2015/0032626 A1 | 1/2015 | Dill et al. |
| 2015/0032627 A1 | 1/2015 | Dill et al. |
| 2015/0046339 A1 | 2/2015 | Wong et al. |
| 2015/0066790 A1 | 3/2015 | Desanti |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0100442 A1 | 4/2015 | Van Heerden et al. |
| 2015/0100495 A1 | 4/2015 | Salama et al. |
| 2015/0112781 A1 | 4/2015 | Clark et al. |
| 2015/0120472 A1 | 4/2015 | Aabye et al. |
| 2015/0121063 A1 | 4/2015 | Maller et al. |
| 2015/0134514 A1 | 5/2015 | Chan et al. |
| 2015/0134540 A1 | 5/2015 | Law et al. |
| 2015/0137938 A1 | 5/2015 | Slaby et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0186855 A1* | 7/2015 | Bennett ............... G06Q 20/102 705/40 |
| 2015/0186872 A1 | 7/2015 | Sobol et al. |
| 2015/0186875 A1 | 7/2015 | Zhang et al. |
| 2015/0186886 A1 | 7/2015 | Schwalb et al. |
| 2015/0186952 A1 | 7/2015 | Brown et al. |
| 2015/0187021 A1 | 7/2015 | Moring et al. |
| 2015/0193131 A1 | 7/2015 | Bayer et al. |
| 2015/0193745 A1 | 7/2015 | Handwerger et al. |
| 2015/0193869 A1 | 7/2015 | Del Vecchio et al. |
| 2015/0213435 A1 | 7/2015 | Douglas et al. |
| 2015/0220914 A1 | 8/2015 | Purves et al. |
| 2015/0229622 A1 | 8/2015 | Grigg et al. |
| 2015/0237026 A1 | 8/2015 | Kumar |

(56) References Cited

U.S. PATENT DOCUMENTS

| | | |
|---|---|---|
| 2015/0242987 A1 | 8/2015 | Lee et al. |
| 2015/0254647 A1 | 9/2015 | Bondesen et al. |
| 2015/0254660 A1 | 9/2015 | Allison et al. |
| 2015/0254668 A1 | 9/2015 | Guiney et al. |
| 2015/0254698 A1 | 9/2015 | Bondesen et al. |
| 2015/0254699 A1 | 9/2015 | Bondesen et al. |
| 2015/0278799 A1 | 10/2015 | Palanisamy |
| 2015/0278816 A1 | 10/2015 | Fleishman et al. |
| 2015/0287015 A1 | 10/2015 | Kaplinger et al. |
| 2015/0287037 A1 | 10/2015 | Salmon et al. |
| 2015/0324768 A1 | 11/2015 | Filter et al. |
| 2015/0332252 A1 | 11/2015 | Shahrokhi et al. |
| 2015/0333964 A1 | 11/2015 | Wang et al. |
| 2015/0339662 A1 | 11/2015 | Huang et al. |
| 2015/0339663 A1* | 11/2015 | Lopreiato ............ G06Q 20/385 705/69 |
| 2015/0339671 A1 | 11/2015 | Krietzman et al. |
| 2015/0348029 A1 | 12/2015 | Van Os et al. |
| 2015/0363810 A1 | 12/2015 | Kim et al. |
| 2015/0371212 A1 | 12/2015 | Giordano et al. |
| 2015/0371234 A1 | 12/2015 | Huang et al. |
| 2015/0371326 A1 | 12/2015 | Montesano et al. |
| 2016/0004876 A1 | 1/2016 | Bye et al. |
| 2016/0012465 A1 | 1/2016 | Sharp |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0048828 A1 | 2/2016 | Lee |
| 2016/0048929 A1 | 2/2016 | Parento et al. |
| 2016/0054336 A1 | 2/2016 | Anderberg et al. |
| 2016/0063496 A1 | 3/2016 | Royyuru et al. |
| 2016/0065370 A1 | 3/2016 | Le Saint et al. |
| 2016/0071071 A1 | 3/2016 | Lazay |
| 2016/0071074 A1 | 3/2016 | Baird |
| 2016/0071096 A1 | 3/2016 | Rosca |
| 2016/0071097 A1 | 3/2016 | Lazay |
| 2016/0071099 A1 | 3/2016 | Lazay |
| 2016/0071109 A1 | 3/2016 | Lazay |
| 2016/0071110 A1 | 3/2016 | Lazay |
| 2016/0086170 A1 | 3/2016 | Hurt et al. |
| 2016/0086179 A1 | 3/2016 | Barbier |
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0132884 A1 | 5/2016 | Fridman et al. |
| 2016/0140555 A1 | 5/2016 | Scipioni |
| 2016/0140561 A1 | 5/2016 | Cowan |
| 2016/0162882 A1 | 6/2016 | Mcclung, III |
| 2016/0162889 A1 | 6/2016 | Badenhorst |
| 2016/0180305 A1 | 6/2016 | Dresser et al. |
| 2016/0269416 A1* | 9/2016 | Camenisch ............ H04L 63/126 |
| 2016/0283925 A1 | 9/2016 | Lavu et al. |
| 2016/0342962 A1 | 11/2016 | Brown et al. |
| 2016/0342992 A1 | 11/2016 | Lee |
| 2016/0343043 A1 | 11/2016 | Hicks et al. |
| 2016/0379215 A1 | 12/2016 | Clerkin |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0061438 A1 | 3/2017 | Patel |
| 2017/0091758 A1 | 3/2017 | Kim et al. |
| 2017/0164139 A1 | 6/2017 | Deselaers et al. |
| 2017/0178110 A1 | 6/2017 | Swanson et al. |
| 2017/0185989 A1 | 6/2017 | Bozovich, Jr. |
| 2017/0193468 A1 | 7/2017 | Chougule et al. |
| 2017/0228715 A1 | 8/2017 | Gurunathan |
| 2017/0236118 A1 | 8/2017 | Laracey |
| 2017/0337542 A1 | 11/2017 | Kim et al. |
| 2017/0357969 A1 | 12/2017 | Huang et al. |
| 2017/0357977 A1 | 12/2017 | Pitz et al. |
| 2017/0364914 A1 | 12/2017 | Howard |
| 2018/0007052 A1 | 1/2018 | Quentin |
| 2018/0012203 A1 | 1/2018 | Hall |
| 2018/0032981 A1 | 2/2018 | Shanmugam et al. |
| 2018/0068308 A1 | 3/2018 | Gupta et al. |
| 2018/0082283 A1 | 3/2018 | Sharma |
| 2018/0096428 A1 | 4/2018 | Gorenstein |
| 2018/0157336 A1 | 6/2018 | Harris et al. |
| 2018/0219863 A1* | 8/2018 | Tran ........................ H04L 63/08 |
| 2018/0285836 A1 | 10/2018 | Enobakhare |
| 2018/0322488 A1 | 11/2018 | Arana et al. |
| 2018/0324204 A1* | 11/2018 | McClory ............... G06F 9/5027 |
| 2018/0365675 A1 | 12/2018 | Sivaraman |
| 2018/0374076 A1 | 12/2018 | Wheeler |
| 2019/0108505 A1 | 4/2019 | Perlman |
| 2019/0122222 A1 | 4/2019 | Uechi |
| 2019/0165942 A1* | 5/2019 | Subramaniam ....... H04M 17/10 |
| 2019/0220908 A1 | 7/2019 | Wilkes |
| 2019/0236577 A1 | 8/2019 | Schmid et al. |
| 2019/0280863 A1 | 9/2019 | Meyer et al. |
| 2019/0303803 A1 | 10/2019 | Buc et al. |
| 2019/0304029 A1 | 10/2019 | Murray et al. |
| 2019/0385250 A1 | 12/2019 | Bhattacharjee et al. |
| 2020/0005277 A1 | 1/2020 | Prabhu et al. |
| 2020/0028753 A1 | 1/2020 | Powar et al. |
| 2020/0034813 A1 | 1/2020 | Calinog et al. |
| 2020/0051117 A1* | 2/2020 | Mitchell ............ G06Q 30/0239 |
| 2020/0076813 A1 | 3/2020 | Felice-Steele et al. |
| 2020/0097957 A1 | 3/2020 | Driggs et al. |
| 2020/0151706 A1 | 5/2020 | Mossoba et al. |
| 2020/0175496 A1 | 6/2020 | Finke et al. |
| 2020/0219060 A1 | 7/2020 | Fredericks et al. |
| 2020/0279305 A1 | 9/2020 | Mossoba et al. |
| 2020/0372536 A1 | 11/2020 | Scislowski et al. |
| 2021/0019718 A1 | 1/2021 | Moskowitz et al. |
| 2021/0027291 A1 | 1/2021 | Ranganathan |
| 2021/0056552 A1 | 2/2021 | Murray |
| 2021/0110392 A1 | 4/2021 | Lacoss-Arnold et al. |
| 2021/0158333 A1 | 5/2021 | Cohen et al. |
| 2021/0166260 A1 | 6/2021 | Ho et al. |
| 2021/0358754 A1 | 11/2021 | Masuoka et al. |
| 2021/0398179 A1 | 12/2021 | Kolaja et al. |
| 2022/0027873 A1 | 1/2022 | Pathuri et al. |
| 2022/0101609 A1 | 3/2022 | Hu et al. |
| 2022/0147967 A1 | 5/2022 | Clark |
| 2022/0210209 A1 | 6/2022 | Vanbuskirk et al. |
| 2022/0215356 A1 | 7/2022 | Dakshinyam et al. |
| 2022/0343380 A1 | 10/2022 | Abhyankar et al. |

FOREIGN PATENT DOCUMENTS

| | | | |
|---|---|---|---|
| WO | WO-2011/100529 A1 | 8/2011 | |
| WO | WO-2011/113121 A1 | 9/2011 | |
| WO | WO-2011159842 A2 * | 12/2011 | ......... G06F 21/6218 |
| WO | WO-2012/139003 A2 | 10/2012 | |
| WO | WO-2013/044175 A1 | 3/2013 | |
| WO | WO-2013/079793 A1 | 6/2013 | |
| WO | WO-2014/111888 A1 | 7/2014 | |
| WO | WO-2014/134180 A2 | 9/2014 | |
| WO | WO-2014/207615 A1 | 12/2014 | |
| WO | WO-2014/210321 A2 | 12/2014 | |
| WO | WO-2015/023172 A2 | 2/2015 | |
| WO | WO-2015/054697 A1 | 4/2015 | |
| WO | WO-2016/009198 A1 | 1/2016 | |
| WO | WO-2016/053975 A1 | 4/2016 | |
| WO | WO-2016/097879 A1 | 6/2016 | |
| WO | WO-2016/153977 A1 | 9/2016 | |
| WO | WO-2016/172107 A1 | 10/2016 | |
| WO | WO-2016/196054 A1 | 12/2016 | |
| WO | WO-2017/106309 A1 | 6/2017 | |
| WO | WO-2018/005798 A1 | 1/2018 | |

OTHER PUBLICATIONS

"Polito et al., Inter-provider AAA and Billing of VoIP Users with Token-based Method, Dec. 26, 2007, IEEE Xplore, entire document" (Year: 2007).*

(56) References Cited

OTHER PUBLICATIONS

Authors et al.: Disclosed anonymously, Notifying a User When a Bill is Due Using a Notification on the User's Mobile Device, Oct. 18, 2013 IP.com PAD, entire document (Year: 2013).
"Cashcloud Mobile eWallet", FinTech Forum Exchange, Jul. 1, 2016. 4 pages.
"Cashcloud mobile eWallet", Popote Payments, www.popotepayments. com, 2016. 6 pages.
A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).
Alipay, Alipay Documentation Red Packet QR Code Introduction, printed on Sep. 30, 2019 at Internet address https://intl.alipay.com/doc/redpacket/scrzsv, 2 pages.
Alipay, Trust Makes It Simple, printed on Sep. 30, 2019 from Internet address https://intl.alipay.com/, 3 pages.
Bravo, Bravo Pay, CrunchBase, printed on Sep. 30, 2019 from Internet address https://www.crunchbase.com/organization/bravo#section-overview, 9 pages.
Bravo, Tip or Pay Your Tour Guide Without Sharing Personal Info, printed on Sep. 30, 2019 from Internet address https://trybravo.com, 4 pages.
Bravo, Trybravo's Competitors, Revenue, Number of Employees, Funding and Acquisitions, printed from Internet address https://www.owler.com/company/trybravo on Sep. 30, 2019, 2 pages.
DipJar, printed on Sep. 30, 2019 from Internet address https://www.dipjar.com/, 10 pages.
EMV, "Payment Tokenisation Specification Technical Framework", 2014 EMVCO, LLC. 84 pages.
How to Control Children's Spending on Debit Cards | Money | by Jill Paperworth, May 10, 2009, https:www.theguardian.com/money/2009/mar/.../children-debit-cards-online-spend . . . (Year: 2009).
Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.
LevelUp, Restaurant Customers Expect Seamless Digital Experiences, printed on Sep. 30, 2019 from Internet address https://www.thelevelup.com/, 4 pages.
N. C. Kiran and G. N. Kumar, "Reliable OSPM schema for secure transaction using mobile agent in micropayment system," 2013 Fourth International Conference on Computing, Communications and Networking Technologies (ICCCNT), 2013, pp. 1-6, doi: 10.1109/ICCCNT.2013.6726503. (Year: 2013).
P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6, doi: 1109/CEWIT.2013.6713767. (Year: 2013).
Smart Card Alliance, "The Mobile Payments and NFC Landscape: A U.S. Perspective," Sep. 2011. 53 pages.
Square, Inc., Grow Your Business Your Way With Square Tools, printed on Sep. 30, 2019 from Internet address https://squareup.com/us/en, 8 pages.
TSIP, Introducing Helping Heart—a Contactless Payment Jacket to Help the Homeless, dated Jul. 4, 2017, printed on Sep. 30, 2019 from Internet address https://www.tsip.co.uk/blog/2019/2/19/introducing-helping-heart-a-contactless-payment-jacket-to-help-the-homeless, 4 pages.
Uber, How Uber Works, printed on Sep. 30, 2019 from Internet address https://www.uber.com/us/en/about/how-does-uber-work/, 6 pages.
W. Adi, A. Al-Qayedi, A. A. Zarooni and A. Mabrouk, "Secured multi-identity mobile infrastructure and offline mobile-assisted micropayment application," 2004 IEEE Wireless Communications and Networking Conference (IEEE Cat. No. 04TH8733), 2004, pp. 879-882 vol. 2, doi: 10.1109/WCNC.2004.1311302. (Year: 2004).
Wazeopedia, Main Page, printed on Sep. 30, 2019 from Internet address https://wazeopedia.waze.com/wiki/USA/Main_Page, 3 pages.
White, Ron, "How Computers Work", Que Publishing, 7th Ed, Oct. 15, 2003, p. 4. 23 pages.
Yang, Ming-Hour. "Security enhanced EMV-based mobile payment protocol." TheScientificWorldJournal vol. 2014 (2014): 864571. Doi: 10.115/2014/864571 (Year: 2014).
"Wang et al. Mobile payment security, threats, and challenges, Mar. 24, 2016, IEEE Xplore, Entire document" (Year: 2016).
Authors et al: Tianliang Lei ; Title: Investigation of Cross-Social Network User Identification; Date of Conference: Apr. 21-22, 2022. (Year: 2022).
Authors: Saygin Baksi et al; Title: Optimal primary-secondary user pairing and power allocation in cognitive cooperative multiple access channels; Date Added to IEEE Xplore: Apr. 10, 2014 (Year: 2014).
Hany Herb, Hassan Farahat, and Mohamed Ezz, SecureSMSPay: Secure SMS Mobile Payment Model, 2008, 2008 2nd International Conference on Anti-counterfeiting, Security and Identification (pp. 11-17) (Year:2008).
J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MU E.2009.62. (Year: 2009).
Latterell, Kayla, "How Do Gift Cards Work?," https://www.cardsource.com/news/how-do-gift-cards-work, pp. 1-6.
1. Authors: Saygin Baksi et al; Title: Optimal primary-secondary user pairing and power allocation in cognitive cooperative multiple access channels; Date Added to IEEE Xplore: Apr. 10, 2014 (Year: 2014).
2. Authors et al: Tianliang Lei ; Title: Investigation of Cross-Social Network User Identification; Date of Conference: Apr. 21-22, 2022 . (Year: 2022).
P2P-Paid: A Peer-to-Peer Wireless Payment System by Gao et al (Year: 2005).
"Authors et al., Secure Authorization Token, Sep. 18, 2013, IP.com PAD, entire document" (Year: 2013).
Kyrillidis; Mayes; Markantonakis, Card-present Transactions on the Internet Using the Smart CardWeb Server, 2013, IEEE, 12th, p. 616 (Year: 2013).
Urien, P., et al., "A breakthrough for prepaid payment: End to end token exchange and management using secure SSL channels created by EAP-TLS smart cards", 2011 International Conference on Collaboration Technologies and Systems (CTS), 2011. (Year: 2011).

* cited by examiner

BILLER DIRECTORY AND PAYMENTS ENGINE ARCHITECTURE

CROSS-REFERENCE TO RELATED APPLICATION

This application claims the benefit of and priority to U.S. Provisional Patent Application No. 62/725,235 entitled "BILLER DIRECTORY AND PAYMENT CONSORTIUM SYSTEMS AND METHODS," filed Aug. 30, 2018, this application also claims the benefit of and priority to U.S. Provisional Patent Application No. 62/787,073 entitled "BILLER DIRECTORY AND PAYMENT SYSTEMS AND METHODS," filed Dec. 31, 2018, which are incorporated herein by reference in their entireties.

TECHNICAL FIELD

The present application relates generally to multiparty bill presentment and payment processing systems. In particular, the present application relates systems, methods, and application programming interfaces (APIs) that support biller enrollment and payments engine architectures.

BACKGROUND

A bill payment infrastructure generally includes financial institutions, billers and customers. When ACH (Automated Clearing House) is used to make the bill payments, financial institutions can be classified as originating deposit financial institutions (ODFI) and receiving deposit financial institutions (RDFI). ODFIs hold customer accounts from which funds are withdrawn to make a bill payment. Correspondingly, RDFIs hold customer accounts where funds are deposited when a bill payment is made to a biller. While ACH is sometimes used herein as an example, the terms "originating financial institution" and "receiving financial institution" are also used herein in the context of other situations where payments may be made via other (non-ACH) payment rails (networks or platforms).

A bill payment infrastructure allows a customer of a financial institution to use online/mobile banking to make payments to the financial institution or to third-party billers. From the perspective of a particular financial institution, billers (payees) can be classified as "on-us" billers," "off-us banking" billers, and "off-us non-banking" billers. When the particular financial institution itself is the biller, the biller is an "on-us" biller. For example, a bank offering both a checking account and a credit card account to a customer is an "on-us" biller when the bank sends a credit card bill for the credit card account to the customer.

An "off-us" billing relationship exists when the biller and the financial institution are different. Depending on whether the biller is a customer of the financial institution, the "off-us" billing relationship subdivides into "banking" billers and "non-banking" billers. In an "off-us banking biller" relationship, both the biller and the payer have a banking relationship with the same financial institution. (Thus, both the biller and the billed customer are referred to as "customers" of the financial institution.) For example, a utility company may have an account in a particular bank to receive utility bill payments from a billed customer. The billed customer may also have an account with the same bank which the customer uses for making the payments to the utility company. Thus, the utility company is an "off-us banking biller."

In an "off-us non-banking biller" relationship, the biller is a customer of a different bank than the bank having the billed customer's account. For example, the biller may be a utility company that uses a different bank than the payer, and only the payer (i.e., the billed customer) that is paying the utility bill is a customer of the financial institution. As a result, two different financial institutions are involved when an "off-us non-banking biller" bills a customer. Conventionally, each financial institution has a set of its own "on-us" biller products as well as relationships with multiple "off-us" billers.

In a conventional bill payment infrastructure, many payment processes are performed off-line or in an uncoordinated fashion or both. These example processes include off-line clearing of electronic payments, third party check processing and printing, third party e-payment processor activities (such as biller directory maintenance, payee validation, and e-payment provisioning), and fraud prevention activities. In conventional arrangements, different financial institutions often do not connect, verify information, and process payments among the different financial institutions themselves. Even with third-party processors, each financial institution typically still has to set up communication infrastructures to accommodate the requirements of multiple, different third-party processors.

SUMMARY

Various embodiments may relate to systems, methods, and computer-readable media.

In one example embodiment, a payer computing system includes a processing resource, a memory resource, and computer-executable instructions stored thereon and embodied in a customer-side application programming interface (API). The instructions, when executed by the processing resource, cause the payer computing system to receive an electronic payment request and, in response, generate a request (e.g., a first API message) to access a biller computing system using a previously generated payer electronic token. The request is transmitted to the biller computing system. The payer computing system receives (e.g., via a second API message) payment information provided by the biller computing system in response to the request to access. Based on payment information, the payer computing system generates a payment transaction and causes (e.g., via a third API message) the payment transaction to be initiated. The payment transaction includes electronic instructions to transfer an amount of funds determined based on payment information from a source account associated with the payer to a target account associated with a biller.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

Like reference numerals indicate like elements.

DETAILED DESCRIPTION

Figure 1:
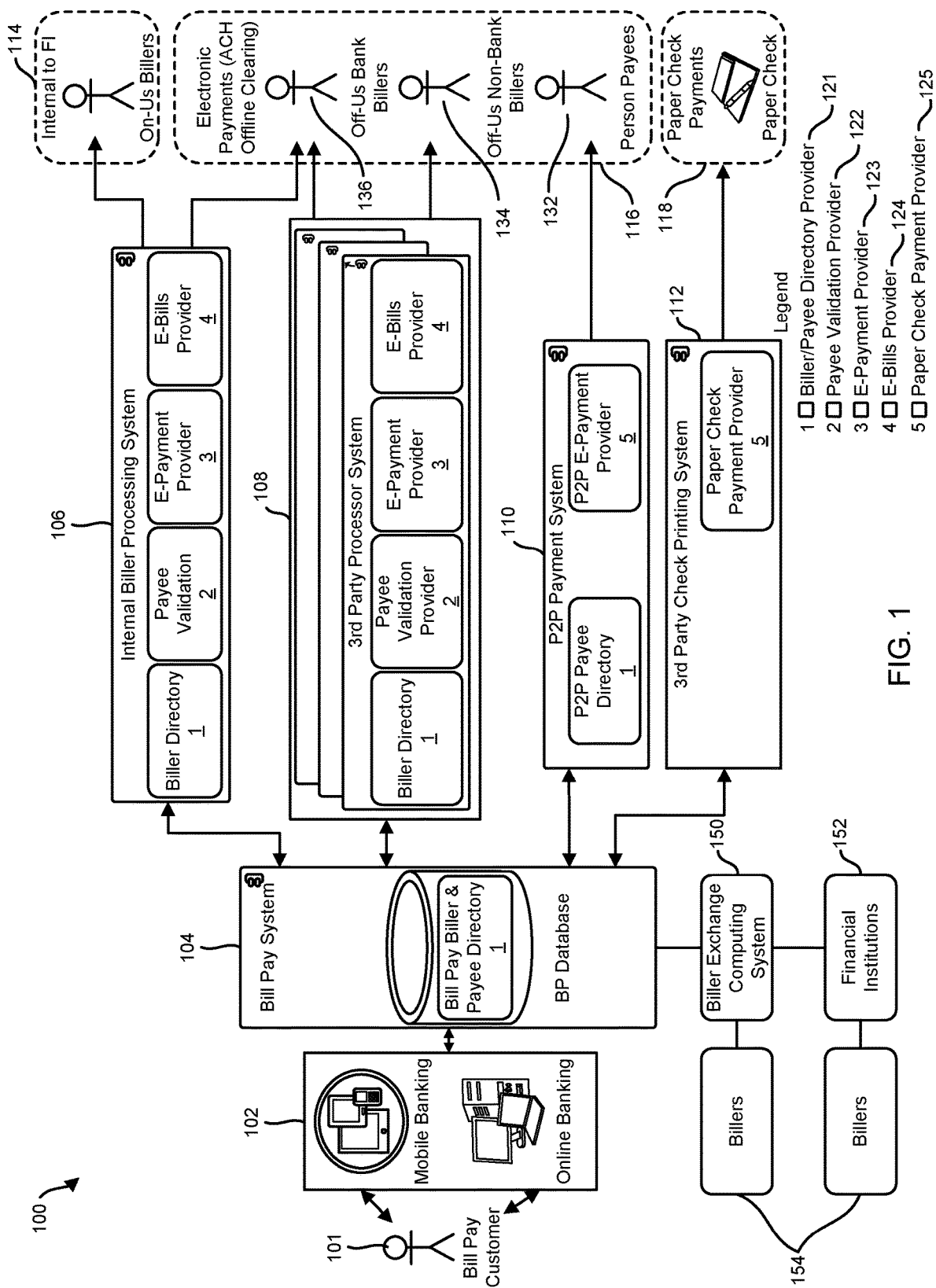
FIG. 1 is a block diagram of an example bill payment infrastructure including third-party processor entities, wherein the bill payment infrastructure includes the biller exchange computing systems and methods disclosed herein

This disclosure presents biller exchange computing systems and methods. One or more example embodiments, and/or implementation examples of the disclosed biller exchange computing systems are generally illustrated in the figures. The biller exchange computing systems include two or more members (e.g., consortium members), which may include financial institutions and third party payment processors. Financial institutions may perform "on-us" and/or "off-us" payment transactions. The biller exchange computing systems enable the member financial institutions to conduct transactions by interacting directly with each other rather than via intermediaries, thus increasing transaction efficiency. In other embodiments, intermediaries such as third party payment processors may be used, for example, in situations where third party billers are already registered with such intermediaries. Members may provide secure and real-time or instant payment transactions with minimal time delay, which is achieved through specific technical configurations. Furthermore, the biller exchange computing systems allow consumers, billers, financial institutions, and payment processors to fluidly interact with each other to reduce resistance in information flow.

At a high level, the disclosed biller exchange computing systems and methods may include a distributed application programming interface (API) system and one or more synchronized biller directories, collectively referred to as a payments engine. In some embodiments, the distributed API system is coordinated by a biller exchange computing system (e.g., providing central management). The distributed API system may be deployed on the computing systems of various financial institutions, billers, and on the biller exchange computing system. In some embodiments, financial institutions may create a separate operating entity that implements the centralized biller exchange computing system to enable secure payments. The distributed API system may also enable tokenization of access credentials to validate the payee/payer relationships between financial institutions (e.g., originating and receiving financial institutions), electronic bill inquiries, payment transactions, and so on.

Advantageously, the disclosed biller exchange computing systems and methods allow various financial institutions and billers to achieve improved customer experience, reduce costs, and achieve cross-financial institution integration. Customer experience for retail customers and billers is improved through real-time or instant display and exchange of detailed biller and payment data, expedited payment delivery and receipts, an increase in direct electronic payments, accurate payee creation and linkage, and reduced return and misapplied payment items for billers.

The disclosed biller exchange computing systems enable financial institutions to collaborate and reduce costs by streamlining electronic processing of financial transactions. This improves data security, decreases biller processing exceptions and risks, minimizes the number of parties involved in a transaction by reducing the need to use third-party processors, improves operational efficiency through standardization and reusability of components, and minimizes paper check issuance to payees. As such, the disclosed biller exchange computing systems can minimize data-related reasons for issuing paper checks, which include biller account validation rule failure, invalid actual biller accounts, or incorrect customer-entered payee names or addresses.

Furthermore, the biller exchange computing systems and methods disclosed herein allow financial institutions to reduce transaction costs and to achieve cross financial institution integration in payment processing.

For example, in some embodiments, example biller exchange computing systems and methods may use an API arrangement in which each participating entity (financial institutions, billers, and a centralized biller exchange computer system) exposes a set of APIs that are accessible to other participating entities. For example, each entity may offer an enroll customer to biller API, an inquire biller or bill API, a pay biller API, and a deliver invoice API. For example, if a customer has a demand deposit account at bank A and has a mortgage with bank B, then bank B may offer an enroll customer to biller API that enables setting up bank B as a biller of the customer in the bill pay system of bank A. Thereafter, the customer may then go to online bill pay at bank A and perform other operations that are supported by the other afore-mentioned APIs (in this example, provided by bank B), such as inquire about bills, pay bills, or receive invoices, without needing to visit the website of bank B. Similar functionality may be provided with respect to other billers (i.e., billers that are not financial institutions) that provide the aforementioned APIs. Hence, for example, a biller may offer an enroll customer to biller API that enables setting up the biller as a biller of the customer in the bill pay system of bank A. Thereafter, the customer may then go to online bill pay at bank A and perform other operations that are supported by the other afore-mentioned APIs (in this example, provided by the biller), such as inquiring about bills and paying bills. For example, the customer may be able to review historical transactions with the biller from the online banking website of the financial institution, retrieve copies (e.g., portable document format (PDF) copies) of recent statements, pay bills, and so on, all in real time and without needing to visit the website of the biller.

The embodiments of the biller exchange computing systems and methods described herein improve computer-related technology and includes performing, using specifically configured processors, computing devices, and computing systems, steps that cannot be done by conventional computing systems or human actors. For example, the biller exchange computing systems may be configured to execute specific data flow sequences, using one or more processors of an example biller exchange computing system, to process data relevant to payment processing transactions. Such data includes counterparty validation and historical payment transactions. This data may be used to generate programmatically codified counterparty relationships and/or to enable the generation of bills by making predictions based on historical data (e.g., payment amount predictions, due date predictions, etc.).

Advantageously, the embodiments of the biller exchange computing systems and methods described herein allow consortium members (e.g., financial institutions) to minimize fraud through advance counterparty verification and by securely exchanging sensitive customer and payment data, through an API of the biller exchange computing system, in a tokenized form.

As another advantage, the API infrastructure of the present disclosure allows for streamlining financial transactions by providing a reduced set of user interfaces delivered to the users via user computing devices (for example, as part of a mobile application, a web-based interface, etc.) and communicatively coupled to the biller exchange computing system through an API. For instance, in an example embodiment described in reference to FIGS. 7-9, the biller exchange computing system allows at least six computing devices (a customer computing device, an ODFI application/web server, an ODFI back-end computing system, the biller exchange computing system, an RDFI computing system, and a biller computing device) to seamlessly, in real-time or instant, complete an end-to-end, secure payment transaction, inclusive of processing a customer payment request, counterparty verification using tokenized information, and a funds transfer, using fewer function calls made by each of the above parties at relevant times using a single distributed API. From the perspective of the consumer, the consumer is provided with the ability to do more at a single online/mobile banking website, which reduces or eliminates the need for the consumer to visit various biller websites, and reduces the need of the various biller websites to authenticate the consumer and serve up web pages detailing the current account status and payment history of the consumer.

Figure 2A:
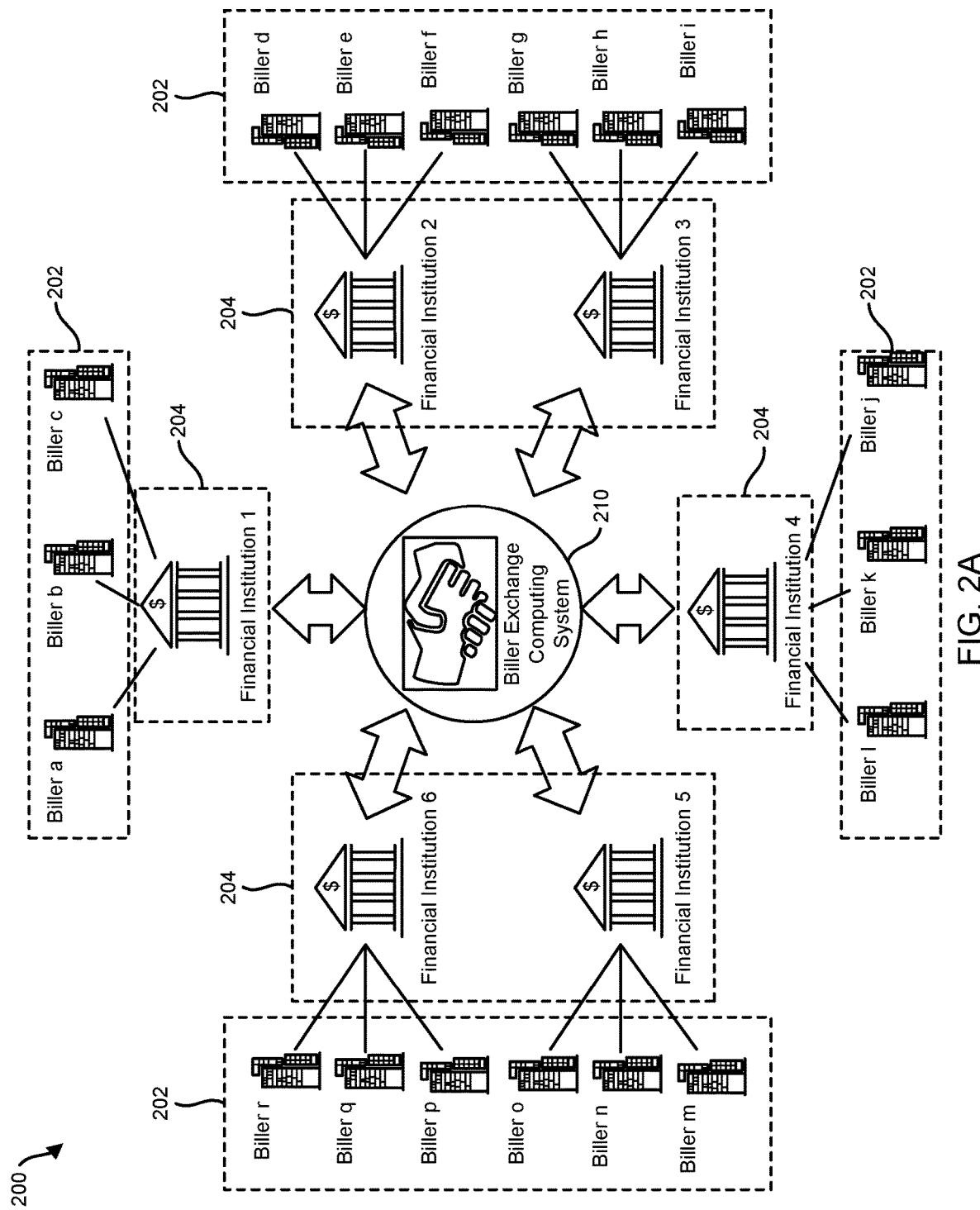
FIG. 2A is a diagram of another example bill payment infrastructure using biller exchange computing systems and methods.
Figure 2B:
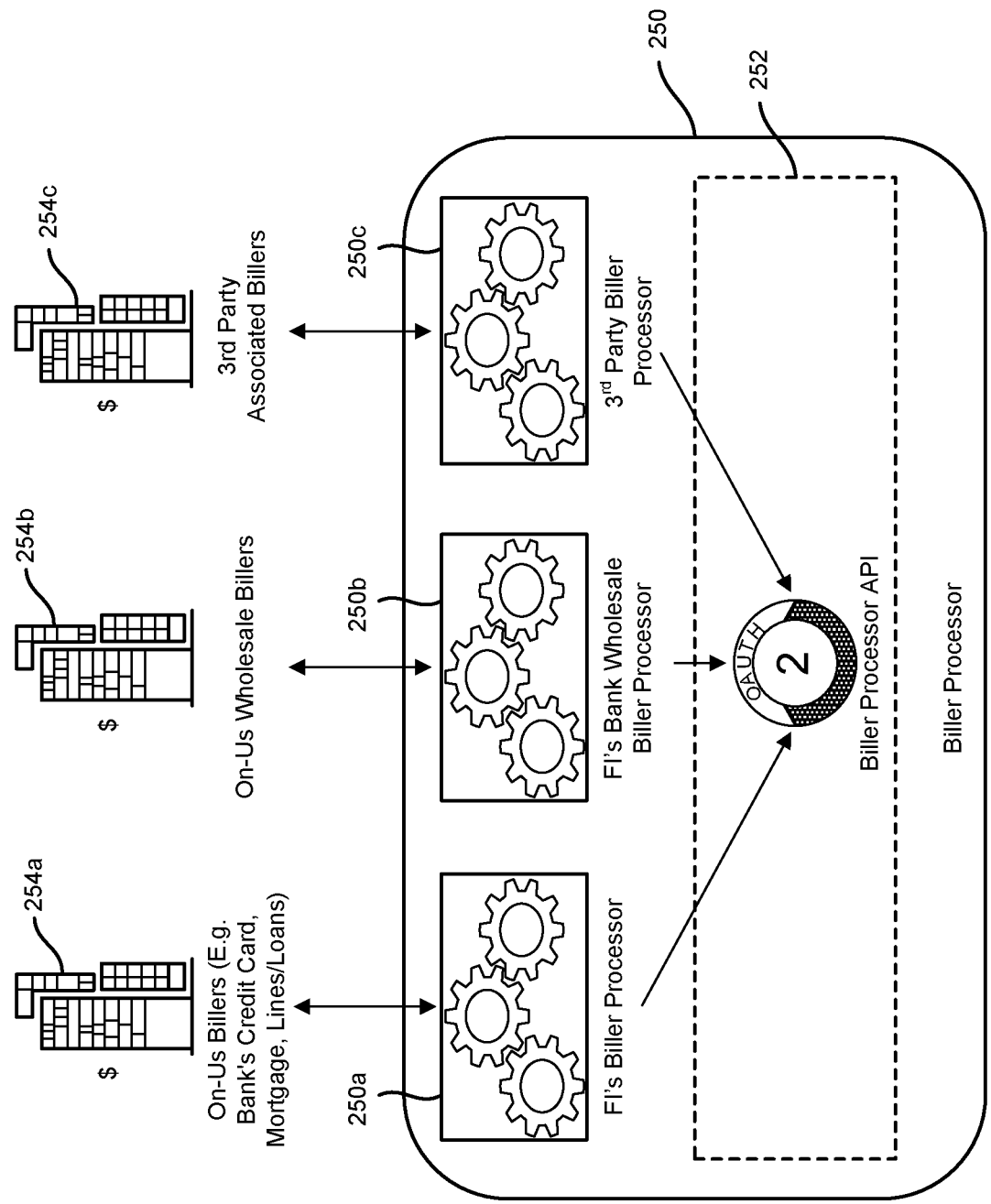
FIG. 2B is a diagram of yet another example bill payment infrastructure using biller exchange computing systems and methods, the infrastructure further including one or more biller processors.

Referring now to FIGS. 1-2B, FIGS. 1-2B are diagrams of example bill payment infrastructures that use biller exchange computing systems and methods. Each of FIGS. 1-2B provide details about different aspects of the bill payment infrastructure. Generally, FIGS. 1-2B describe, according to various embodiments, the mechanics by which a financial institution makes a payment to a biller at the request of a bill pay customer. The payment infrastructures shown in these Figures include the biller exchange computing systems and methods disclosed herein. At a high level, the biller exchange computing systems and methods disclosed herein standardize the APIs to enable system interoperability and centralize bill presentment and payment processing capabilities. One of skill will appreciate that various features of the Figures may be combined according to various embodiments.

Referring now to FIG. 1, FIG. 1 is a block diagram of an example bill payment infrastructure including third-party processor entities, where the bill payment infrastructure includes the biller exchange computing systems and methods. The systems of FIG. 1 are shown from the perspective of a financial institution making a payment to a biller. The illustrated various systems may provide a data management and communication platform for entities associated with these individual providers to perform transactions. The configuration and arrangement of these systems, and the corresponding methods for procuring, storing, securing, managing, and communicating the data can substantially affect the efficiency and capabilities of transactions, such as payment transactions, among parties associated with these different providers. The features implemented by the financial institution may include a mobile/online banking website 102, a bill pay system 104, and a biller processing system 106.

In FIG. 1, a bill pay customer 101 is shown on the far left, and various types of billers are shown on the far right. The various types of billers include an on-us biller 114, off-us banking billers 136, and off-us non-banking billers 132, 134. The biller 132 is an individual/person payee, to whom the bill pay customer 101 may also wish to make a payment. Also shown located between the bill pay customer 101 on the left and the billers 114, 132, 134 and 136 on the right are various payment systems 106, 108, 110, and 112 which may be used to make payments to the billers 114, 132, 134 and 136. The payment systems 106, 108, 110, and 112 provide various types of resources that enable making payments. The resources that each provides are indicated with legends numbered 1 through 5. The resources provided include bill/payee directories (1), payee validation (2), electronic payments (3), electronic bills (4), and paper check payments (5). Different payment systems and different resources may be used to make a given payment, depending on the type of biller, as described in greater detail below.

The bill pay customer 101 can be an individual or an institution. For example, an individual bill pay customer 101 may want to use the bill payment infrastructure 100 to pay a credit card bill, mortgage bill, utility bill, internet bill, etc. The bill pay customer 101 may use a computing device to interact with an online/mobile banking website 102 of the financial institution of the bill pay customer 101. While in the online/mobile banking website 102, the bill pay customer may interact with a bill pay system 104 of the financial institution. The interaction may include data input, responding to requests and verifications, and obtaining secure information for making transaction decisions. The computing device of the customer 101 may be configured to connect to a bill pay system 104 using various communication methods, such as via the internet, a local endpoint, etc.

The bill pay system 104 may include a directory of biller-payees. For example, if the individual bill pay customer 101 has an account with a utility company, the utility company may be included in the directory as a payee. To add the utility company as a biller, the customer 101 may access the biller directory and locate the utility company within the biller directory. Generally, a biller directory is a data store that contains payee information, such as routing information, account information, payee financial institution name and/or identifier, etc. The information in the biller directory may, for example, be provided by the biller itself during a biller registration (enrollment) process. The biller directory provides an easy way for the customer 101 to set up a new payee in the bill pay system 100, and ensures that the correct account information, routing information, etc., will be used for the newly set up biller when the customer 101 makes payments to the biller.

The bill pay system 104 is communicatively coupled (e.g., via a network) to several systems, including the internal "on-us" payment processing system 106, the third-party processor system 108, the P2P payment computer system 110 (e.g., such as Zelle®), and a third-party check printing system 112.

Generally, each of these respective systems is suitable for processing payments under specific scenarios. For example, the internal on-us payment processing system 106 may be configured to process payments made in the context of an "on us" billing relationship, such as when the same financial institution holds a deposit account and a credit card account (i.e., the "on-us" biller) of the bill pay customer 101. The internal on-us biller processing system 106 may also process "off-us" banking billers 136, such as a utility company that uses the same bank as the bill pay customer 101.

The third-party processor system 108 may be configured to process payments made to "off-us" billers, including both banking and non-banking billers. The third-party processor system 108 may further be configured to process electronic invoices or bills from off-us billers. For example, some billers may have registered with the third party processor system 108 and not with the financial institution. In such scenarios, the account information, routing information, etc., may be stored in the biller directory of the third party processor system 108, and made accessible to the bill pay system 104 via, for example, an API connection, such that the bill pay system 104 can make a payment to the biller through the third-party processor system 108.

The P2P payment computer system 110 may be configured to process peer-to-peer payments, such as when the bill pay customer 101 pays another individual. The third-party check printing system 112 may process paper checks 118 for any of the above scenarios. In some embodiments, the biller exchange computing systems disclosed herein uses the third-party printing system 112 to process, issue, or receive check payments 118, for example, via check printer or mail delivery, as a compatibility mechanism to handle paper checks. The P2P payment computer system 110 may further be coupled with or connected to the biller exchange computing systems and methods disclosed herein, and thus be modified, changed, upgraded, or otherwise improved to process transactions.

Also shown in FIG. 1 are a biller exchange computing system 150 (sometimes referred to as an on-we exchange computing system), one or more additional financial institutions 152, and additional billers 154 connected to the one or more additional financial institutions and the biller exchange computing system. These features are described in greater detail below in connection with the Figures that follow.

Referring now to FIG. 2A, FIG. 2A describes at a high level a centralized biller exchange computing system 210 that enables communication between multiple financial institutions and billers. The infrastructure of FIG. 2A is shown from the perspective of the biller exchange computing system 210, which provides the API features that connects multiple billers and financial institutions. The biller exchange computing system 210 may perform or enable both on-us and off-us billing transactions, among other various types of transactions. The biller exchange computing system 210 may be communicatively coupled to various financial institutions 204, such as banks or similar entities receiving, lending, collecting, investing, borrowing, or otherwise transferring funds as an agent or a principal in association with one or more separate entities. Each of these financial institutions 204 can have its own set of "on-us" billing products, such as mortgage loans, credit cards, etc.

As shown, each of these financial institutions 204 can also have its own relationships with one or more "off-us" billers 202, which can be banking or non-banking billers. Through the biller exchange computing system 210, customers may have enhanced access to billing information associated with the various billers. These relationships are managed by the biller exchange computing system 210 through a secure enrollment process (for example, using the OAuth authorization protocol as described further herein). The secure enrollment process may be a one-time process or may include periodic information intake. The secure enrollment process may require multi-factor authorization or other identification/verification process.

According to various implementations, the biller exchange computing system 210 can utilize a distributed API system, which can include callable functions accessible to the computing systems of the various financial institutions 204 and/or "off-us" billers 202. The distributed API can be deployed on the biller exchange computing system 210, on the computing systems of the various financial institutions 204, and/or on the computing systems of the various "off-us" billers 202.

The biller exchange computing system 210 enables real-time executions, including for example, customer-biller enrollment, biller information inquiry, payment transactions, and delivery of invoices or bills. In addition, the biller exchange computing system 210 may provide expedited access to biller data and payment transactions across multiple different financial institutions 204. The distributed API is configured to enable bill presentment requests, payment requests, enrollment, data synchronization, and/or clearance and settlement activities.

Referring now to FIG. 2B, FIG. 2B describes at a high level a bill payment infrastructure that includes one or more biller processors and a biller exchange computing system, such as the biller exchange computing systems of FIG. 1 and FIG. 2A. The infrastructure of FIG. 2B is shown from the perspective of a biller processor.

Generally, a biller processor is an intermediary entity between a biller and a biller's financial institution. A biller processor may be a financial institution's biller processor 250a, the biller financial institution's wholesale biller processor 250b, or a third-party biller processor 250c. A financial institution's biller processor 250a may be internal to or associated with a financial institution, such as an on-us biller

254*a*. For example, a bank may offer a credit card product, a mortgage product, and various lines of credit and loan products. For these on-us billers (e.g., the bank's own billers or products), the bank may use the financial institution's biller processor 250*a* to route the payments to and from recipient banks, where each product may have different accounts to which the funds are routed such that each product is associated with an individual biller. A biller financial institution's wholesale biller processor 250*b* may be associated with wholesale biller products 254*b* offered by a financial institution. For example, a bank may have a commercial banking product offered to large retailers, such that the bank is a wholesale biller for the payments processed on behalf of the retailer, where the bank is the custodian of the retailer's account to which the payments are posted. A third-party biller processor 250*c* may be associated with a third-party biller 254*c*, such that payments may be routed to the third-party biller processor 250*c*. In some embodiments, each of the financial institution's biller processor 250*a*, the biller financial institution's wholesale biller processor 250*b*, or a third-party biller processor 250*c* has its own biller directory, which may be synchronized via the biller processor API 252 as described further herein.

Each biller processor is associated with a biller processor computing system 250 (e.g., each biller processor may have its own computing system 250). The biller processor computing system 250 includes a biller processor API 250. The biller processor API 250 is managed and/or deployed using the biller exchange computing system and is structured to connect multiple billers with financial institutions via biller processors, as described further herein. The biller processor API 250 enables biller processors to participate in payment ecosystems and processes described further herein.

FIGS. 3-6 show various aspects of biller exchange computing systems and methods, according to example embodiments. Generally, biller exchange computing systems and methods disclosed herein provide a set of standardized APIs (e.g. distributed APIs) and processing capabilities (collectively, also sometimes referred to as a payments engine) that enable financial institutions to make payments to billers at the request of bill pay customers or in response to receiving an invoice from a biller. The payments engine disclosed herein is structured to enable interoperability among various actors in payments ecosystems described above. For example, the payments engine disclosed herein can be used to enable bill presentment requests, payment requests, enrollment, data synchronization, and/or clearance and settlement activities.

System interoperability, enabled by the systems and methods of the present disclosure, provides the technical benefit of efficiency in incorporating new member systems into the exchange via ready-to-deploy APIs and related electronic data interchange (EDI) functionality. This benefit is particularly evident in hybrid environments, where participant systems may each operate according to different specifications but are nevertheless enabled to exchange transaction data in a consistent format via the APIs disclosed herein. A secondary technical benefit of a standardized API is its improved interface and transaction status monitoring.

To enable system interoperability, transactions are implemented through a distributed set of APIs. Some aspects thereof may be structured according to standardized formats such that various parties may send and receive data according to a predetermined protocol (e.g., EDI format and messaging schema.) Further, in some embodiments, as described herein, the systems and methods of the present disclosure may make use of existing EDI specifications but further enhance EDI messages developed according to these specifications to accommodate exchange participant requirements. Enhancing already existing EDI specifications and/or authorization infrastructures, such as OAuth, provides the technical benefit of streamlined participant on-boarding, API deployment, and system integration. At the same time, the ability to further augment already existing specifications and authorization infrastructures ensures that system security is not compromised as a result of standardization. This is achieved, in some embodiments, by supporting institution-specific security requirements through extensible tokenization, as discussed further herein.

Figure 3:
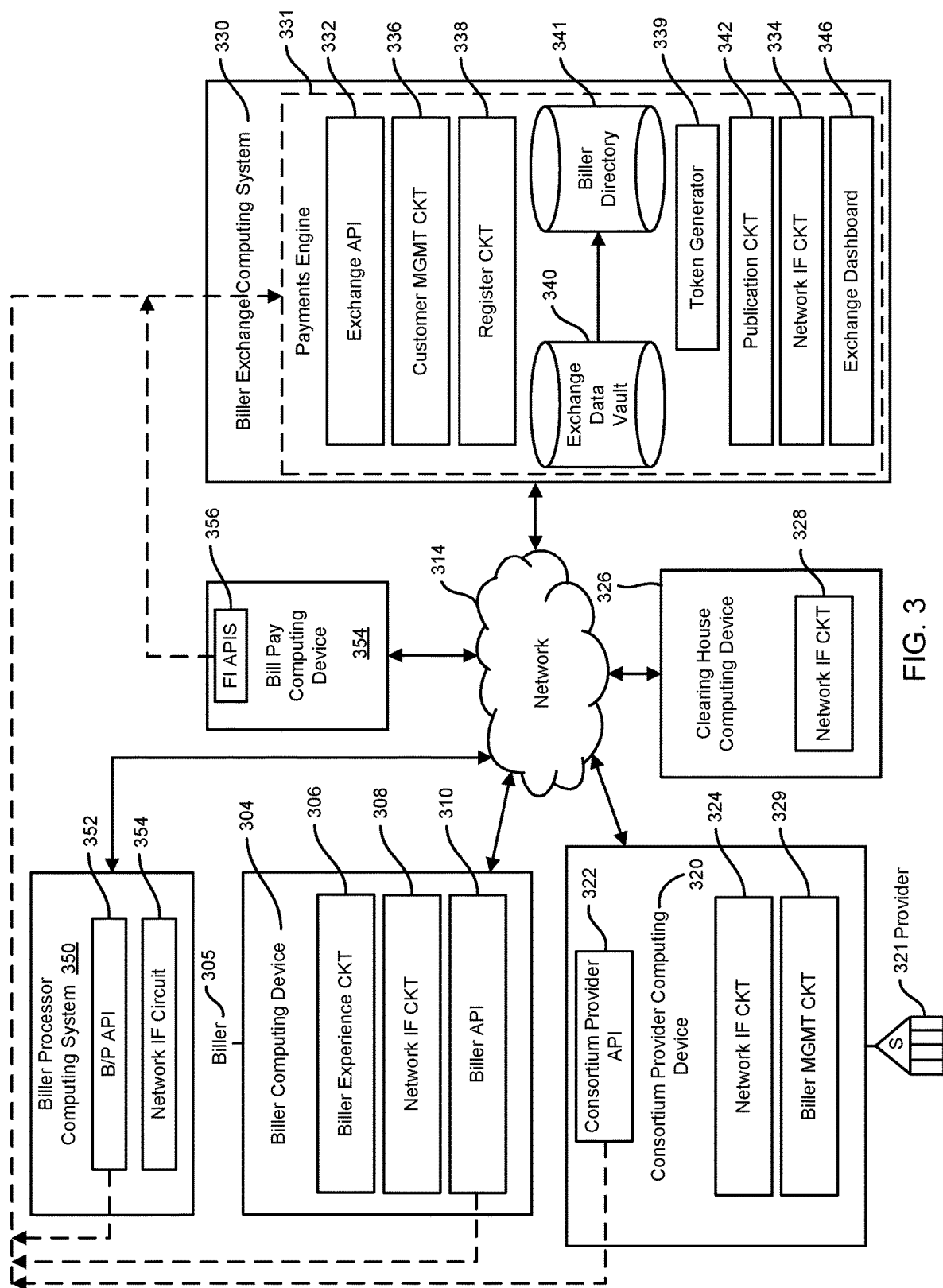
FIG. 3 is a block diagram of an example bill payment computing environment using biller exchange computing systems and methods applicable to the example bill payment infrastructures disclosed herein.
Figure 4:
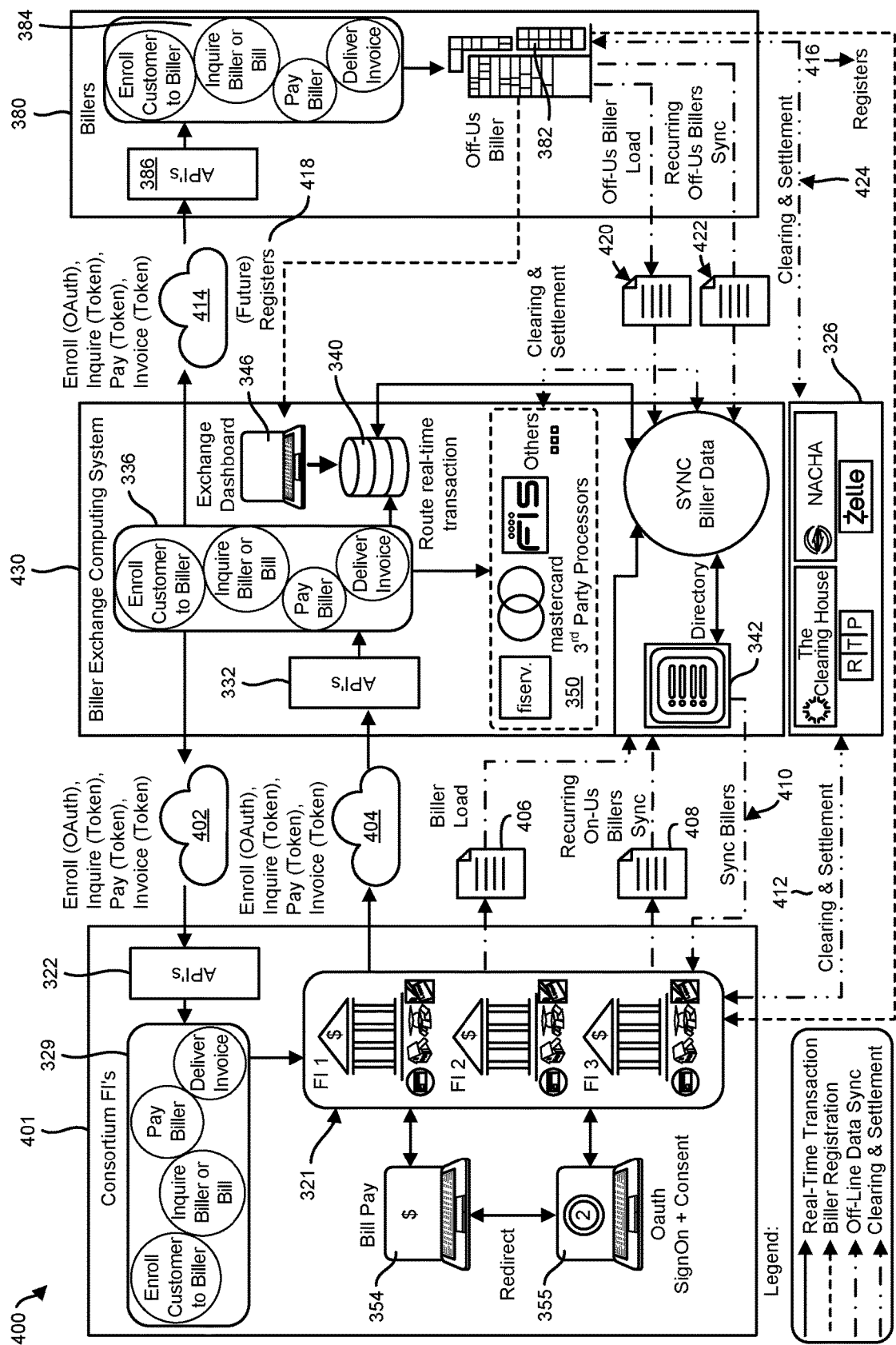
FIG. 4 is a data flow diagram of a detailed example bill payment computing environment using biller exchange computing systems and methods.
Figure 5:
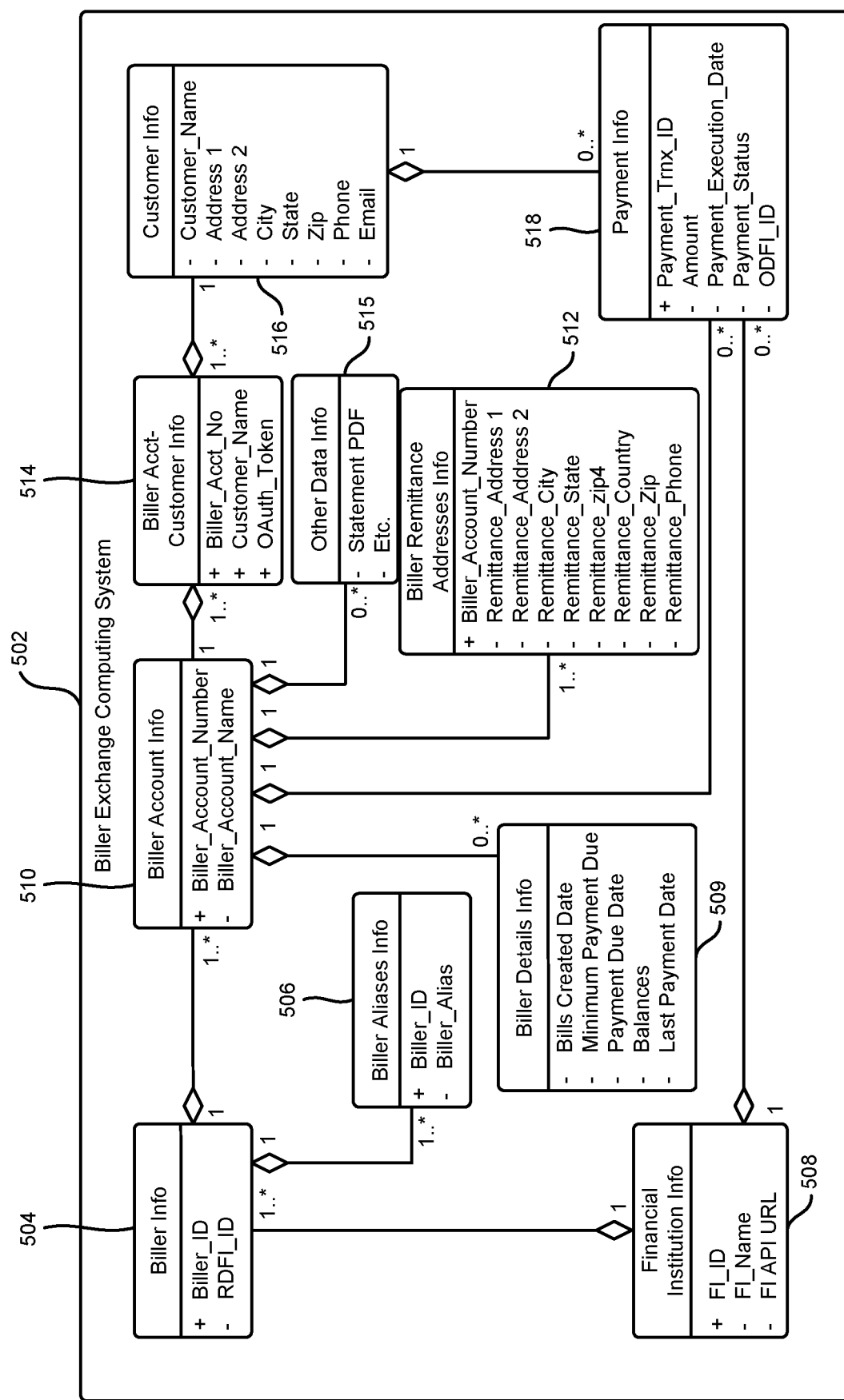
FIG. 5 is a data model diagram of one example data store used in the example biller exchange computing system.
Figure 6:
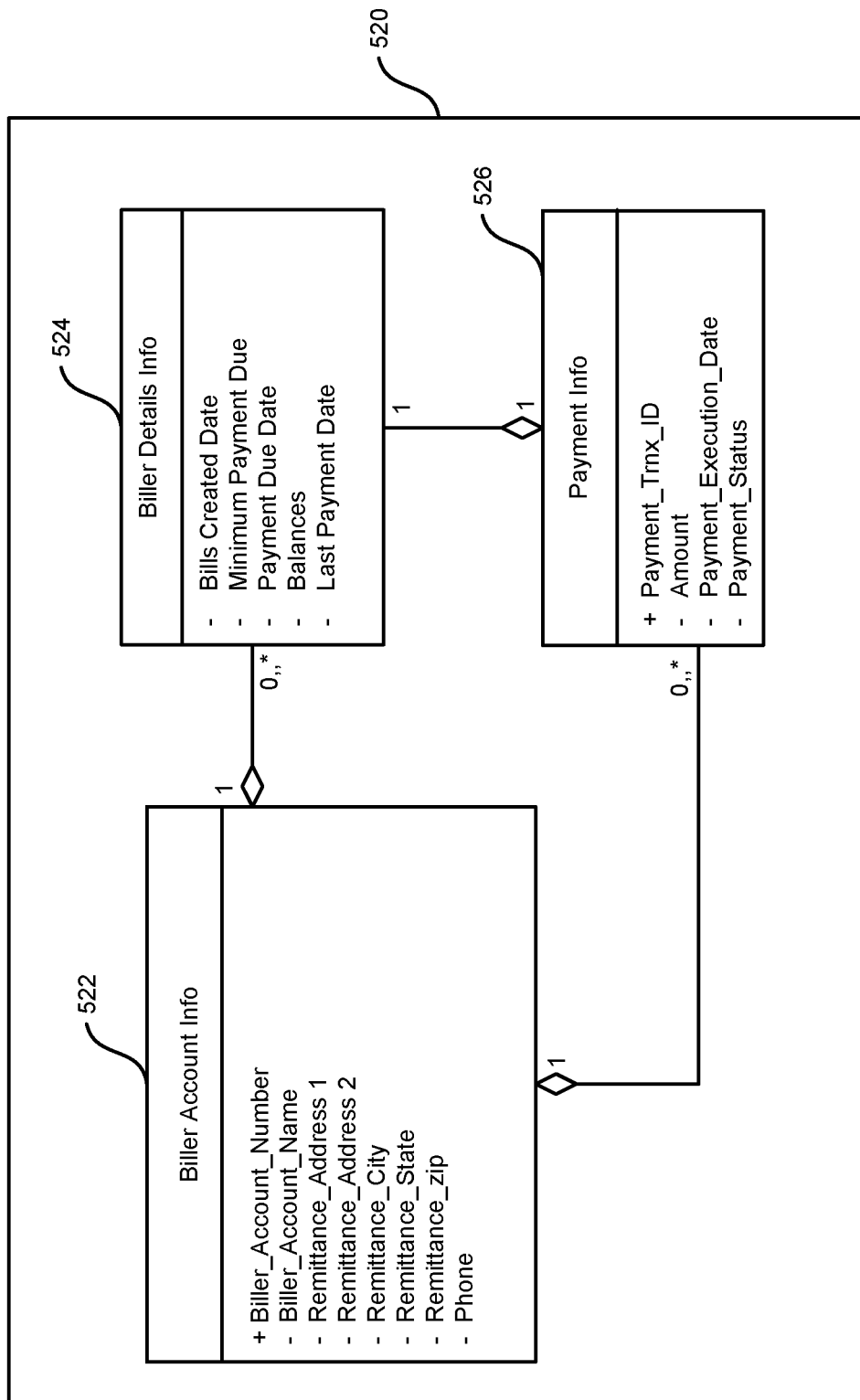
FIG. 6 is a data model diagram of another example data store associated with a biller computing device for use in the example biller exchange computing system.

FIG. 3 shows details of network interconnection and logic contained at various computer systems of financial institutions, billers, bill pay customers, and the biller exchange computing system. FIG. 4 shows details of data flows between financial institutions, billers, and the biller exchange computing system. In some embodiments, the biller exchange computing system is implemented by a consortium of financial institutions, and therefore is sometimes referred to as an "on-we" exchange computing system. In some embodiments, one or more financial institutions may perform one or more of the functions of the biller exchange computing system such that, in some implementations, the biller exchange computing system is not implemented by a stand-alone entity. FIGS. 5 and 6 show example data models for the payments engine embodied in the systems of FIGS. 3 and 4.

Referring now to FIG. 3, FIG. 3 is a block diagram of an example bill payment computing environment using biller exchange computing systems and methods applicable to the example bill payment infrastructures disclosed herein. The bill payment computing environment may include a biller computing device 304, a financial institution computing device 320, a clearinghouse computing device 326, a user computing device 354, a biller exchange computing system 330, and/or a biller processor computing system 350. According to various embodiments, all or some of these components can be standalone or combined. For example, any of the biller computing system 304, financial institution computing system 320, clearinghouse computing system 326, and/or biller processor computing system 350 can be individual devices or combined/integrated with the biller exchange computing system 330. In one example embodiment, the biller exchange computing system 330 may be structured to manage and deploy aspects of its payments engine via the APIs. The API libraries may be installed on the respective computing systems and/or made accessible to the respective computing system(s) without being installed on the respective computing systems.

In the embodiment of FIG. 3, the biller exchange computing system 330 is managed and/or operated a consortium of financial institutions, such as banks. The biller computing system 304 is managed and/or operated by a biller. Generally, the biller holds a deposit account at a financial institution that receives payment transactions where payment funds are deposited into the deposit account of the biller. The biller processor computing system 350 is managed by a biller processor.

As shown, each of the user computing device 354 (e.g., used by the bill pay customer), the biller computing system 304, the financial institution computing system 320, the clearinghouse computing system 326, the biller exchange computing system 330, and the biller processor computing system 350 are communicatively coupled via the network 314. The network 314 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments or combinations, the network 314 includes a local area network or a wide area network. In some embodiments, the network 314 includes the internet. The network 314 is enabled by short- and/or long-range communication technologies, such as Bluetooth® transceivers, Bluetooth® beacons, RFID transceivers, NFC transceivers, Wi-Fi transceivers, cellular transceivers, wired network connections (e.g., Ethernet), etc.

Each of the biller computing system 304, the financial institution computing system 320, the clearinghouse computing system 326, the biller exchange computing system 330, and the biller processor computing system 350 have respective network interface circuits, such as the network interface circuits 310, 324, 328, 334 and 354. The network interface circuits 310, 324, 328, 334 and 354 may include components described herein and/or additional similar components that allow and/or enable connectivity to the network 314. In some embodiments, data that passes through the respective network interface circuits 310, 324, 328, 334 and 354 is cryptographically protected (e.g., encrypted) such that each of the network interface circuits 310, 324, 328, 334 and 354 is a secure communication module.

In some embodiments, data passing through the respective network interface circuits 310, 324, 328, 334 and 354 is tokenized such that sensitive data (for example, account number(s), user location, personally identifiable information, and the like) is obscured for transmission within or outside the computing environment. Various communication protocols can be used, including, for example, any of the Internet protocol (IP), transmission control protocol (TCP), hypertext transfer protocol (http), simple object access protocol (SOAP), file transfer protocol (FTP), etc. In some embodiments, secure versions of internet protocols may be used to exchange data via the network interface circuits 310, 324, 328, 334 and 354, such as IPsec, https://, etc.

Data, messages, packages, etc. may be transferred over the network 314, through network interface circuits 310, 324, 328, 334 and 354, using application programming interfaces (APIs) 310, 322, 332, 354 and 356. For example, each entity may offer an enroll customer to biller API, an inquire biller or bill API, a pay biller API, and a deliver invoice API. In some embodiments, some or all functions of the API can be stored in a storage media that is communicatively coupled but not local to the respective system, such as cloud-based storage. Thus, the functions of the API can be executed by or on each respective computing environment.

The distributed API is used by computing systems to exchange data and make function calls in a structured format. The distributed API (e.g., biller APIs 308, financial institution APIs 322, exchange APIs 332, biller processor API 352, bill pay user financial institution API 356, etc.) may be configured to specify an appropriate communication protocol using a suitable EDI standard or technology. The EDI standard (e.g., messaging standard and/or supporting technology) may include any of a SQL data set, a protocol buffer message stream, an instantiated class implemented in a suitable object-oriented programming language (e.g., Java, Ruby, C#, etc.), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC), etc.). As such, EDI messages may be implemented in any of the above or using another suitable technology.

Further, in some embodiments, data is exchanged by components of the payments engine using web services. Where data is exchanged using an API configured to exchange web service messages, some or all components of the computing environment may include or may be associated with (e.g., as a client computing device) one or more web service node(s). The web service may be identifiable using a unique network address, such as an IP address, a uniform resource locator (URL), etc. Some or all components of the computing environment may include circuits structured to access and exchange data using one or more remote procedure call protocols, such as Java remote method invocation (RMI), Windows distributed component object model (DCOM), etc. The web service node(s) may include a web service library comprising callable code functions. The callable code functions may be structured according to a predefined format, which may include a service name (interface name), an operation name (e.g., read, write, initialize a class, etc.), operation input parameters and data type, operation return values and data type, service message format, etc. Examples of callable code functions are provided further herein as embodied in various components of the payments engine, such as an example API for biller enrollment, example API for bill inquiry and presentment, example API for payments, and example API for biller directory synchronization.

According to various embodiments, each of the biller computing system 304, financial institution computing system 320, clearinghouse computing system 326, biller exchange computing system 330, and biller processor computing system 350 may include a processor, a memory, at least one electronic circuit and at least one data storage entity for implementing the methods as disclosed. The processor may be a stand-alone or dedicated processor and/or a shared (virtualized) processing resource. The memory may be a stand-alone or dedicated memory device and/or a shared (virtualized) memory resource. The processing resource and/or memory resource may be dynamically allocated as needed to perform the functionality described herein. As used herein, the terms "processor" and "processing resource" are used interchangeably, as are the terms "memory" and "memory resource". The circuits may include instructions stored in the memory (whether the memory associated with a particular computing system or with another system, such as the biller exchange computing system) and executed by the processor. The circuits may include various code, functions and resources (e.g., files, compiled objects, reference libraries, etc.) that comprise, in whole or in part, various APIs.

More specifically, one or more electronic circuit(s) of the biller computing system 304, financial institution computing system 320, clearinghouse computing system 326, biller exchange computing system 330, or biller processor computing system 350 may be implemented as software code suitable for compilation, object code, executable file(s) and/or code, a set of machine language instructions, and/or in another suitable form for carrying out the computer-implemented method(s) described herein. In some embodiments, the one or more electronic circuit(s) may be implemented in a distributed fashion such that at least some of the code is executed and/or compiled on a system that is different from the system hosting the code, executable files, etc. These circuits may be structured to interact (exchange data, instructions, electronic signals, etc.) with one another, for example, through the API of the respective system.

According to various embodiments, these electronic circuits may be deployed to client systems (e.g. biller computing system 304, financial institution computing system 320, etc.) in a "light" fashion such that no installation is required, which provides the technical benefit of streamlined application deployment. For example, functionality provided by the circuits can be made accessible to the bill pay user computing device 354, financial institution 321, etc. through a web browser, a browser plug-in with navigable controls, an applet, a virtual application hosted externally to the respective computing system and deployed, by the payments engine of the biller exchange computing system 330, in a software-as-a-service mode, etc. Alternatively or additionally, the functionality provided by the circuits can be deployed and made accessible as an application including executable code packages and the like, which provides the technical benefit of API extensibility by exchange participants.

One or more data storage entities of the biller computing system 304, financial institution computing system 320, clearinghouse computing system 326, biller exchange computing system 330, and the biller processor computing system 350 may be implemented as an electronic structure (s) suitable for storing information, including, for example, one or more persistent electronic structures, such as one or more database(s), electronic file(s), data mart(s), distributed ledger(s) and the like. The data stored in the one or more data storage entities may be stored in a multidimensional form such that the structure of the data storage entity has two dimensions (e.g., a look-up table having indexed data) or more (e.g., a relational database, a multi-dimensional database, an online analytical processing (OLAP) cube, etc.).

The circuits and/or data storage entities may be combined as needed such that one or more data storage entities and/or circuit(s) are implemented in a hybrid form. An example of a hybrid implementation is a data storage entity having a shell and/or providing an API such that a library of code (for example, executable functions containing Data Manipulation Language (DML) instructions) may be used by entities within or outside the computing environment. For example, the exchange data vault 340 and/or biller directory 341 of the payments engine of the biller exchange computing system 330 may be coupled to a code library (e.g., API functions that call stored procedures implemented by a DBMS engine that underlies the vault or directory, etc.), which may be structured to support various system interoperability features described further herein, such as biller directory replication, biller directory synchronization, publishing of updates from auxiliary systems to the biller directory 341 and vice versa, etc.

As shown, the biller computing system 304 includes a biller experience circuit 306 and biller APIs 310. The biller experience circuit 306 is structured to authorize the biller exchange computing system 330 to enroll/create billing relationships for customers, respond to bill presentment requests, and receive and post payment transactions. In some embodiments, the biller experience circuit 306 is structured to generate biller registration requests for the biller exchange computing system 330, initiate biller data propagation or synchronization activities to synchronize data with the biller exchange computing system 330, etc. Additionally, the biller computing system 304 can include various data storage entities configured to store information, such as the tokens generated by token generator 339. The biller APIs 310 are structured to allow external systems to access these example functions.

As shown, the financial institution computing system 320 includes a biller management circuit 329 and financial institution APIs 322. The biller management circuit 329 is structured to manage requests for the biller exchange computing system 330 to enroll/create billing relationships for customers, generate bill presentment requests, and initiate payment transactions. In some embodiments, the biller management circuit 329 is structured to generate financial institution registration requests for the biller exchange computing system 330, initiate financial institution data propagation or synchronization activities to synchronize data with the biller exchange computing system 330, etc. The financial institution APIs 322 are structured to allow external systems to access these example functions. Additionally, the financial institution computing system 320 can include various data storage entities configured to store information, such as the tokens generated by the token generator 339.

As shown, the biller exchange computing system 330 includes exchange APIs 332, a customer management circuit 336, a registration circuit 338, a token generator 339, an exchange data vault 340, an exchange dashboard 346, and a publication circuit 342. In some embodiments, the biller exchange computing system 330 may interact with one or more third-party payment processors 350 communicably connected to the customer management circuit 336.

The customer management circuit 336 is structured to enable billing relationships and enrollment for the banking billers 305 and financial institutions 321. For example, the customer management circuit 336 may participate in the various data acquisition sequences illustrated further herein.

The registration circuit 338 is structured to register billers 305 in response to biller registration requests received from the biller computing system 304. In some embodiments, the registration circuit 338 is structured to register financial institutions 321 in response to requests received from the financial institution computing systems 320. According to various embodiments, these processes can include creation and updating of registry information in the exchange data vault 340.

The token generator 339 is structured to route tokens and authorization requests between the biller computing system 304 and the financial institution computing system 320. Advantageously, in some embodiments security of sensitive information is increased such that the biller computing system 304 is structured to generate and manage authorization tokens and the biller exchange computing system 330 passes along requests and information without storing the tokens.

The publication circuit 342 is structured to enable synchronization of data, such as registry information, among the various systems, as described further herein.

The exchange APIs 332 are structured to enable the above functions of the biller exchange computing system 330. For example, the exchange API 332 may be structured to receive messages from various systems via their respective APIs (e.g., from the biller APIs 310, financial institution APIs 322, biller processor APIs 352, bill pay user financial institution API 356, etc.) and to send messages thereto, as shown in various sequence diagrams illustrative of example embodiments and accompanying the present disclosure.

Referring now to FIG. 4, FIG. 4 is a data flow diagram of a detailed example bill payment computing environment 400 using biller exchange computing systems 330 and methods applicable to the example bill payment infrastructures. At a high level, block 401 represents multiple financial institutions that are members of the exchange and that provide online bill pay services to customers. Block 380 on the right represents multiple off-us biller entities that may send one or more bills to the customer. The biller exchange computing system 330 at the center enables various interactions (as illustrated by solid and dashed line connections according to the legend), including real-time interactions, between the customer side and the off-us biller side, including, for example, allowing the customer to make inquiries of the off-us biller or bill data and pay the bill. The real time interactions may also include allowing the off-us biller to deliver bills and receive payments from the customer. In some implementations, the customer may request a previous bill or invoice issued by the off-us biller, besides inquiring about existing bill(s).

Turning first to the customer side included in the block 401, a customer may access a bill pay mobile/online banking its account with a biller via a user computing device 354. The customer's account may be held by one of the financial institutions 321, each having an associated computer system 320 (FIG. 3).

The customer may use the user computing device 354 to access user interfaces and features related to the operations of the payments engine of the present disclosure. For example, the customer may use the user interface to access a consolidated view of billers and products associated with the customer as well as account status for accounts of the customer that correspond to the products (e.g., credit cart, mortgage, consumer credit account at a retailer, etc.) The features may include real time inquiry of account status, statements, etc.; a timeline of scheduled payments (e.g., for a selectable time period, for selectable multiple billers, etc.); a timeline showing scheduled payments relative to source account balance(s), etc.

In another example, the customer may use the interface to retrieve biller information from a centralized directory and/ or to provide instructions to add a new biller, product, etc. The customer may use the interface to invoke a customer to biller enrollment request, to perform biller lookup and selection from centralized directory, to terminate enrollment, and/or to request a new token to be generated if a customer's account (e.g., source account or target account) is compromised. When the customer invokes a biller enrollment process, the access process may redirect (at 355) the access request to the computing system 320 of another financial institution 321 for OAuth enrollments, as described further herein. Further, in some circumstances, the customer and the financial institutions 321 may complete some or all on-us billings within the computer system 320 of one financial institution 321. In some circumstances, OAuth may be used to obtain account information from off-us billers. For example, if the customer holds a checking account at a Bank 1 and has a mortgage with Bank 2, OAuth may be used to obtain mortgage account information from Bank 2. For on-us banking billers, biller registration information may be provided to the on-we biller directory 342 at operation 408. Hence, in the above example, Bank 2 may provide information about its on-us billers to the on-we biller directory 342, such that the information is available to Bank 1 when the customer wishes to make a payment, for example.

In yet another example, the customer may use the interface to perform invoice inquiry (e.g., to request a bill or balance information from a particular biller, to request invoices due in a particular time period, etc.). Advantageously, invoice inquiry is performed in an interoperable fashion using the biller exchange computing system 330. More generally, the interfaces rendered to the customer may be structured to present information delivered from one or more billers to the consumer (e.g., account status, account information, login information, balances, invoices, transaction history, etc.).

In yet another example, the customer may use the interface to perform and/or schedule payments for one or more billers. Advantageously, payment transactions are initiated in an interoperable fashion using the biller exchange computing system 330. In one example embodiment, the customer may use the interface to complete a payment. The payment transaction may be generated by the one or more APIs (e.g., the APIs 332, etc.) based on payment data pre-populated via an invoice inquiry API message received from a biller computing device via biller API 386.

The bill payment computing environment 400 enables real-time interactions between an off-us biller 382 and the customer using the user computing device 354. To achieve such functionality, electronic interconnection between the off-us biller 382 and the financial institutions 321, and between the off-us biller 382 and the exchange dashboard 390 of the biller exchange computing system 330 need be established. The relationship establishment may be achieved at the register operations 416 and 418, which show two example biller registration processes. In the registration operation 414, the biller registers with the financial institution computing system 320 of one of the financial institutions. As previously indicated, financial institutions typically have an array of off-us banking billers (e.g., a utility company that has an account at the financial institution) to whom they make payments on behalf of other customers (e.g., a residential customer of both the utility and the financial institution). Such billers may already be in the biller directory of the respective financial institution computer system 320. At operation 406, the biller registration information stored in the biller directory of the financial institution computing system 320 may be synchronized with the biller registration information stored in the biller exchange computing system 330.

At registration operation 418, the biller registers directly with the biller exchange computing system 330. For example, if a biller does not have an account with any of the financial institutions that are members of the consortium (off-us non-banking biller), then the biller may register directly with the biller exchange computing system 330. The registration circuit 338 (FIG. 3) is structured to register billers 305, in response to biller registration requests received from the biller computing system 304. In some embodiments, the off-us biller 382 may have real-time interactions with the biller exchange computing system 330 via the exchange dashboard 346, after completion of registration for example.

According to various embodiments, these processes can include creation and updating of registry information in the exchange data vault 340. For example, the registry information regarding financial institutions (e.g., financial institutions 321 and billers 305) can include financial institution names, identifiers, routing numbers (e.g., routing transit numbers (RTN), Swift network identifiers, etc.), account information, etc. In some embodiments, the exchange data vault 340 also includes information about the API functions exposed by the biller computing system 304 or the financial institution computing system 320 to the biller exchange computing system 330. For example, the biller exchange computing system 330 may store version information, function definition libraries, parameter data types, etc. This information can be accessed by the biller exchange computing system 330 when calling the public functions of the respective system's API to route requests, data, signals, etc.

In some embodiments, the off-us billers may enable various processes 336 via its APIs 332. These processes 336 may include operations to enroll customer to biller, to inquire biller or bill, to pay the biller, and/or to deliver an invoice or bill. Correspondingly, the biller exchange computing system 330 may receive requests of these processes 336 via the exchange dashboard 390 and return responses to such requests to biller management circuit 329 associated with the financial institutions 321.

Generally, as with the financial institutions 321, when the billers 380 become members of the consortium and register with the biller exchange computing system 330, these entities provide a one-time initial data load to populate the exchange data vault 340 with registry information, at operation 420. Subsequently, these entities can provide incremental data updates. These processes are managed by the publication circuit 342 of the biller exchange computing system 330, at operation 422.

For example, for a one-time data load, the publication circuit 342 can be configured to receive data in a suitable format, such as a SQL record set, a text file, an Excel file, etc. and execute a series of SQL commands to populate the exchange data vault 340 with this data. To manage incremental data loads, publication circuit 342 can be configured to receive registry data updates from the biller computing system 304 or the financial institution computing system 320 in a suitable format, such as SQL record set, a text file, an Excel file, etc.

In some embodiments, rather than receiving flat files or record sets, the publication circuit 342 can be coupled to a web server and/or can be otherwise configured to receive and decode registry updates as interface messages, such as web service messages in a suitable format (e.g., JSON, REST, etc.). The respective APIs of the source systems can be configured to "push" this data or to respond to the "pull" requests from the exchange APIs 332 of the biller exchange computing system 330. For example, in some embodiments, the publication circuit 342 can be configured to call a public function of the biller APIs 308 and/or the financial institution APIs 322 to request updated data. In some embodiments, the biller computing system 304 or the financial institution computing system 320 can be configured to call a public function of the exchange APIs 332 to "push" the data to the biller exchange computing system 300.

In some embodiments, the publication circuit 342 is structured to interpret (decode, parse, extract, etc.) the data received in a web service message according to a predetermined format, which may include pre-defined field separators, field definitions and labels, field lengths, data types, etc. The decoded data can be saved, as a registry update, in the exchange data vault 340.

Referring further to FIG. 4, at 402, 404, and 414, further details of an API connection between the computing systems 304 of the billers 381, the computer systems 320 of the financial institutions 321, and the biller exchange computing system 330 are shown. The API connection includes APIs 310, 322, 332 the computing systems 304 of the billers 381, the computer systems 320 of the financial institutions 321, and the biller exchange computing system 330, respectively. Each of the APIs 310, 322, 332 provides access to a set of services/processes that may be accessed by appropriate function calls, including enroll customer to biller process, inquire biller or bill process, pay biller process, and deliver invoice process.

Referring first to the enrollment process, this process is shown in further detail relative to FIG. 7A-7E, which show detailed example sequences of API function calls. More generally, however, in order to enable a biller/financial institution relationship, where the biller holds an account at a financial institution for receiving payment and the payer holds an account at another financial institution for initiating payment, the biller exchange computing system 330 is configured to manage requests for the biller exchange computing system 330 to enroll/create billing relationships for customers. In some embodiments, enrollment is a real-time transaction.

In an example embodiment, the customer management circuit 336 of the biller exchange computing system 330 can be structured to receive, from a first computing system (e.g., the financial institution computing system 320) associated with an originating deposit financial institution (e.g., the financial institution 321), an electronic enrollment request. The request comprises identification information associated with a receiving deposit financial institution (e.g., biller 305).

For each of the financial institution 321 and biller 305, the biller exchange computing system 330 can be structured to generate a secure enrollment record. In an example embodiment, the relationship between the financial institution 321 and the biller 305 is created using an OAuth protocol. OAuth (Open Authorization) is a standard for token-based authentication and authorization on the Internet. OAuth is used for access delegation and may be used as a way for internet users to grant websites or applications access to their information on other websites without giving them the passwords. In the context of the present arrangement, OAuth is used as a way for customers to grant online banking websites access to their information on biller websites without giving the financial institution their passwords to the biller websites. In some embodiments, the access given via OAuth is limited access in the sense that the functions the customer may be able to perform via online banking may be made more limited than if the customer accessed the biller website directly. In one example embodiment, financial institution 321 may want to receive access to information managed by the biller computing system 304—for example, to see a bill, to see when a payment is due, or to access other services supported by biller APIs 332. However, the customer may need to access the biller website directly if the customer wishes to perform other functions, such as making changes to services that the customer receives from the biller. The scope of access may be represented by one or more scope variables that may be associated (e.g., stored relationally to) each OAuth token (for example, in the exchange data vault 340 of the biller exchange computing system 330). In some embodiments, the OAuth token is extended (customized) to include further information, such as a customer identifier, source system URL, a biller's product identifier or other abstracted account information, target system (biller or biller processor computing system) URL, payment information (e.g., a monthly payment amount, an auto-pay amount, a pre-set additional monthly principal payment for installment loans, etc.), custom security policy information required by the biller (e.g., customer challenge questions and answers, customer PIN code, etc.), a token expiration data field such that the token is a time-limited token, etc. Thus, the augmented OAuth token may be used for customer account recovery, to identify the biller account and schedule payments, and to support additional biller-specific authentication requirements. In some embodiments, the augmented OAuth token is a self-encoded OAuth token. In some embodiments, the augmented OAuth token is a self-contained way of transmitting data between the source (e.g., customer financial institution) and target (e.g., biller processor or biller financial institution) systems such that the number of copies of the token saved in memory can be minimized.

Further, access privileges given via OAuth may be revoked in response to receiving customer instructions to terminate a customer-biller relationship. For example, the customer may use a user interface of an online banking website to revoke access by the biller exchange computing system 330 to one or more biller websites. In some embodiments, the customer uses a user interface provided by the biller exchange computing system 330, and the biller exchange computing system 330 is structured to terminate the customer-biller association (e.g., by marking an electronic mapping relationship as terminated, expiring the token, etc.) and generate an electronic notification for transmission to the biller. In some embodiments, the customer uses a user interface provided by the biller's online platform to terminate the customer-biller association, and the biller exchange computing system 330 is structured to receive an electronic access revocation message from the biller's computing system and, based on the message, terminate the customer-biller association.

The customer management circuit 336 can be structured to collect authentication data for the biller 305. The authentication data can include identification information of the biller 305, such as IP address, MAC address, entity name, entity identifier, etc. In some embodiments, this information can be provided by the exchange data vault 340 and is browsable using the interface of the first computing device. The authentication data can further include information specific to the relationship between the financial institution 321 and biller 305, such as account number, a proxy/alias for an account, etc.

In response to receiving the authentication data, the customer management circuit 336 can be structured to transmit the authentication data to the biller computing system 304. The biller computing system 304 can verify the authentication data (for example, by querying its internal systems). In some embodiments, the biller computing system 304 can generate a one-time authorization code and send it to the financial institution computing system 320 via the biller exchange computing system 330. The financial institution 321 may be presented with a user interface control requiring the financial institution 321 to enter the one-time authorization code to confirm the identity of the financial institution 321 before verification is completed.

Once verification is completed, the customer management circuit 336 can be structured to transmit a request for a token to the biller computing system 304 and to cause the biller computing system 304 to generate a token using the token generator 339. The token can include de-identified (obscured) sensitive information, such as account number, login credentials, financial institution identifier, biller identifier, and other authorization information. The token is subsequently used during bill inquires and payment transactions to verify that a valid relationship exists between the biller 305 and the financial institution 321 indicating that the financial institution 321 is willing to send payments and biller 305 is willing to receive payments.

The customer management circuit 336 can be structured to generate or cause another computing system to generate a financial institution enrollment record to supplement the tokenized information. The financial institution enrolment record may include the token and may be transmitted from the biller computing system 304 to the biller exchange computing system 300 by calling a public function of the exchange API 332. In some embodiments, enrollment records are product- (account-) level records rather than financial institution-level records, as shown at 514 of FIG. 5.

The customer management circuit 336 can be structured to transmit a first copy of the token to the financial institution computing system 320 and/or direct the biller computing system 304 to retain a second copy of the token. Each respective entity can save its copy of the token in a data store associated with the entity, such as non-volatile memory, a token vault, etc. According to various embodiments, the data store of each respective entity may include a mapping data structure (such as a table) that correlates a reference to a specific system (such as a URL, an IP address, a MAC address, a network path, etc.) with biller financial institution relationship information (such as an account handle, user name, identification number, account number in combination with a reference to a specific system, email address, social media handle, name, telephone number, email address, business address, etc.) In some embodiments, the data store comprises a data structure for storing a timestamp for each token(s). The token(s) may expire and be replaced with new token(s) at periodic intervals, such as, for example, every week, every month, every quarter, every time a token has been used, after a set number of times a token has been used (for example, between one and ten times), etc. In some embodiments, these parameters are encoded in the token instead or in addition to being stored relationally to the token.

Further with respect to 402, 404, and 414, the customer management circuit 336 can be structured to enable bill inquiries and to transfer payments. In some embodiments, the customer management circuit 336 can be structured to allow a customer to specify how the customer would like to configure the payments experience after a customer enrolls with a biller. The customer management circuit 336 may cause the biller exchange computing system 330 to generate a user interface and render the user interface to the computing device 354 of the customer. The user interface may be structured to enable the customer to specify whether the customer would like to initiate payments (e.g., on demand, on a particular day of the month, etc.) or if the customer would like payments to be initiated in response to requests for payments received via the financial institution API 322. In some embodiments, the customer management circuit 336 is structured to store an indicator of customer preference in memory. Based on the indicator and/or the information received via the financial institution API 322 (e.g., invoice information, such as amount due, payoff amount, due date, etc.), the biller exchange computing system 330 may be structured to generate a payment transaction for the customer's review and transmit the payment transaction to computing device 354 of the customer for approval. In some embodiments, multiple transactions may be presented to the customer for approval. In one example implementation, the transactions may be presented as a sequence of screens, one per transaction, on a mobile device of the customer. The biller exchange computing system 330 may comprise functionality to determine, based on the customer's interaction with each screen item, whether a transaction is approved. For example, in one embodiment, swiping in a first particular manner (e.g., swiping up, swiping to the right) may be indicative of approval, swiping in a second particular manner (e.g., swiping left) may be indicative of a instructions to delete the pending transaction, and swiping in a third particular manner (e.g., swiping down) may indicate instructions to flag the transaction for further review by the customer.

In response to an electronic message or an interface interaction indicating approval of the transaction, the biller exchange computing system 330 may initiate a payment transaction. In some embodiments, the payment transaction includes electronic instructions to transfer funds from a source account associated with the customer to a target account associated with a biller (e.g., the financial institution 321). In some embodiments, the payment transaction includes electronic instructions that may be transmitted to a clearance and settlement computing system. In some embodiments, the biller exchange computing system 330 further includes functionality to allow a customer to revoke a pending payment transaction and/or reverse a completed payment transaction. For example, a list of recent transactions may be presented as a sequence of screens, one per transaction, on a mobile device of the customer. The biller exchange computing system 330 may comprise functionality to determine, based on the customer's interaction with each screen item, whether a transaction should be revoked or reversed. In one example embodiment, swiping left may be indicative of instructions to revoke or reverse the transactions. The biller exchange computing system 330 may comprise functionality to display to the customer, via the user interface, a confirmation screen confirming customer instructions to revoke or reverse the transaction. In some embodiments, revocation or reversal functionality is available only within a predetermined amount of time from performing the payment transaction (e.g., 2 hours, close of business, 24 hours, etc.).

Referring further to FIG. 4, at 420 and 424, a clearing process is shown. After a payment transaction is initiated, in some embodiments, the biller exchange computing system 330 is structured to transmit transaction data to a clearinghouse computing system 326 for clearance and settlement. According to various embodiments, the clearinghouse computing system 326 can use various clearance and settlement platforms, such as Zelle®, ACH, TCH RTP®, etc.

Referring now to FIGS. 5 and 6, example data model diagrams are shown for various aspects of the biller exchange computing systems and methods. A biller exchange computing system 330 of FIG. 3 includes a centralized biller directory 341. The biller directory, represented, for example, in FIG. 5 by data storage entity 504 and its related entities, may include, in a standardized format identification data for all billers and/or their associated biller processors, receiving financial institutions (e.g., RDFI) and other payment routing information needed by the payments engine to route payments appropriately. Various other systems of the payment infrastructure may maintain their own copies of the biller directory, which may be maintained via replication and/or synchronization processes described further herein. To that end, FIG. 5 is a data model diagram of one aspect of an example data store used in the example biller exchange computing environment shown in FIG. 4. FIG. 6 is a data model diagram of another aspect of an example data store associated with a biller computing system for use in the example biller exchange computing environment shown in FIG. 4.

As shown, FIG. 5 shows a relational data model diagram for a data store associated with the biller exchange computing system 330, such as the exchange data vault 340 and/or a biller directory 341. The data of the example embodiment is stored and available for inquiry by calling public functions of the exchange API 332 of the biller exchange computing system 330. For example, the data can include data dictionary/registry information for the biller 305 (at 504, 506, 510, 512) and/or financial institution 321 (at 508), customer information (at 514 and 516) and payment transaction information (at 518).

In some embodiments, the data further includes API library information for the respective entity (at 508). More specifically a biller may hold an account at a receiving financial institution, which may be enrolled in the exchange. The financial institution may operate a computing device that may have a financial institution API (e.g., 322 of FIG. 3) deployed to or accessible by that computing device. The API library may be identified by a unique address, such as an API URL stored relationally to the financial institution and biller information as shown at 508. When a customer requests an invoice, schedules a payment, requests enrollment, or otherwise invokes functionality that requires communication with the biller's financial institution, the payments engine (e.g., of the biller exchange computing system 330 of FIG. 3) may query the data store to determine the API URL based on customer identity and the token (at 514), based on enrollment data (at 510), and/or based on biller information (at 504). In some embodiments, these items are determined by decoding the token, which may contain this information. The payments engine may then use the API URL to send payment transactions, enrollment messages, etc. to the financial institution on behalf of the customer.

In some embodiments, the payment transaction information 518 is exposed, via the API, for mining historical trends, predicting future payments, etc. The information can be exposed in a de-identified form and/or may require a token to be accessible. For example, in some embodiments, the biller computing system 304 and/or the financial institution computing system 320 may be required to provide the token generated when the biller/FI relationship was registered via the biller exchange computing system 330 in order to access historical payment information for data mining.

In some embodiments, payment transaction information 518 is aggregated for the purposes of initiating transactions, posting transactions, clearance and settlement, etc. For example, pending transactions can be sent, through the biller exchange computing system 330, in batches to the systems responsible for performing the respective activities (e.g., the biller computing system 304, the clearinghouse computing system 326, etc.).

As shown, FIG. 6 shows a relational data model diagram for a data store associated with a biller computing system 304, according to an example embodiment. In some embodiments, the data is stored in a data storage entity associated with the biller computing system 304. In some embodiments, the data is part of the exchange data vault 340 of FIG. 5. For example, in some embodiments, biller account information stored in the exchange data vault 340 includes the items shown at 502 of FIG. 5 and 522 of FIG. 6.

While the embodiments of FIG. 5 and FIG. 6 are shown as relational databases, other embodiments are contemplated, such as a multi-dimensional database, an online analytical processing (OLAP) cube, a distributed ledger, a collection of cross-referenced flat files, etc.

Figure 8A:
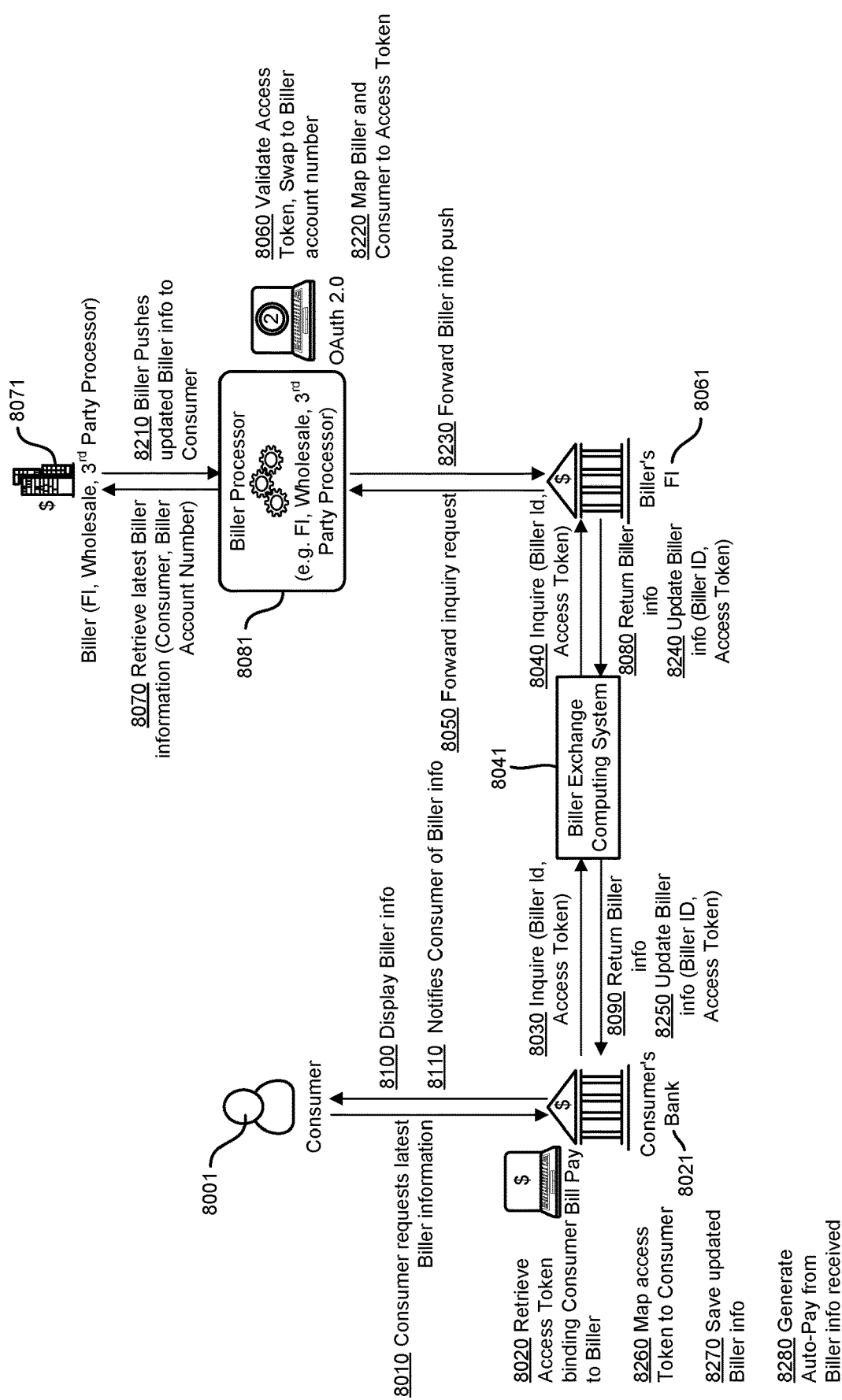
FIG. 8A shows the computing systems involved in the bill inquiry and/or bill presentment process enabled by the biller exchange computing system.
Figure 8B:
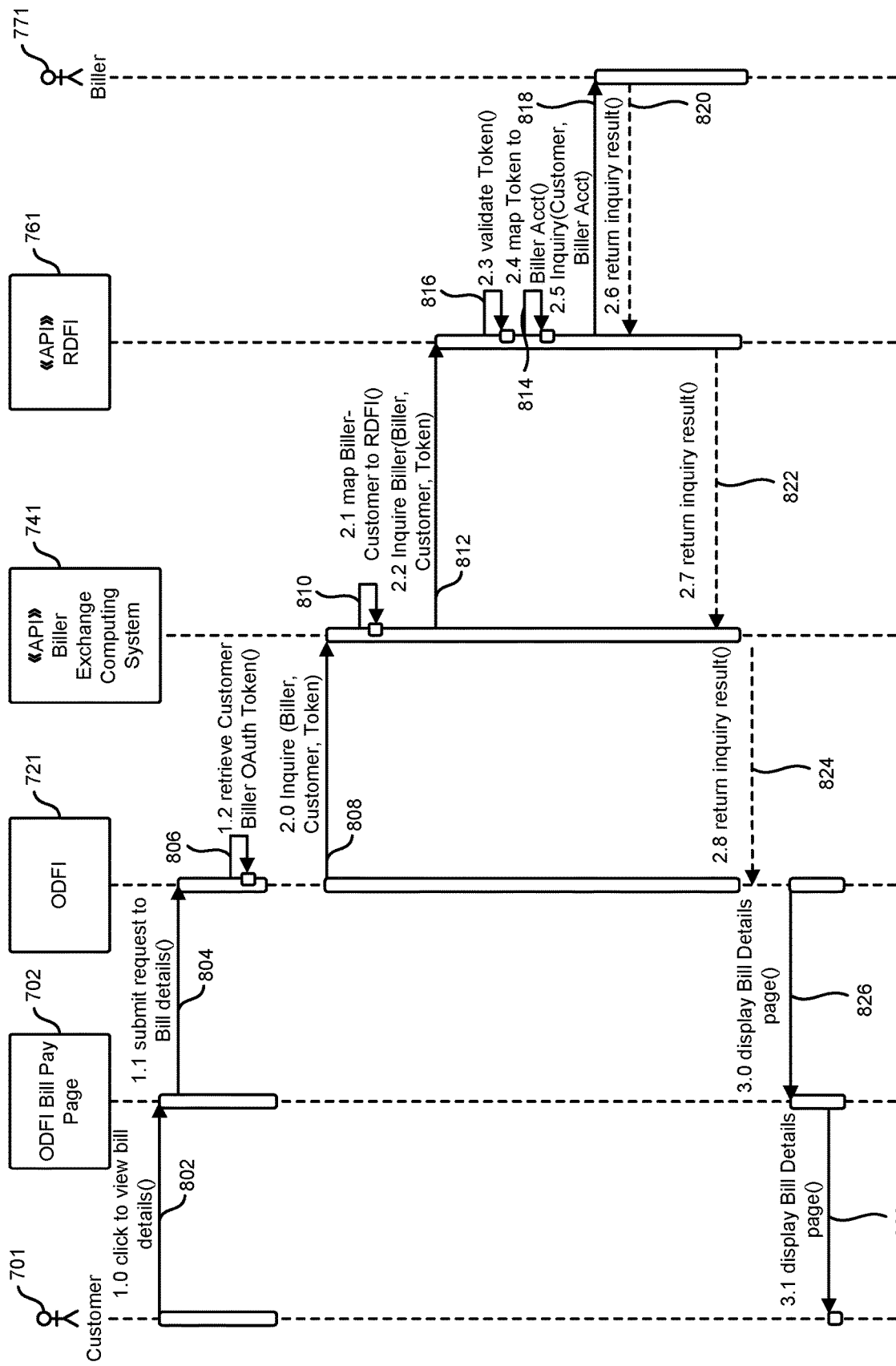
FIG. 8B is a sequence flow diagram for bill inquiry and/or bill presentment using an example API, according to an example embodiment.
Figure 8C:
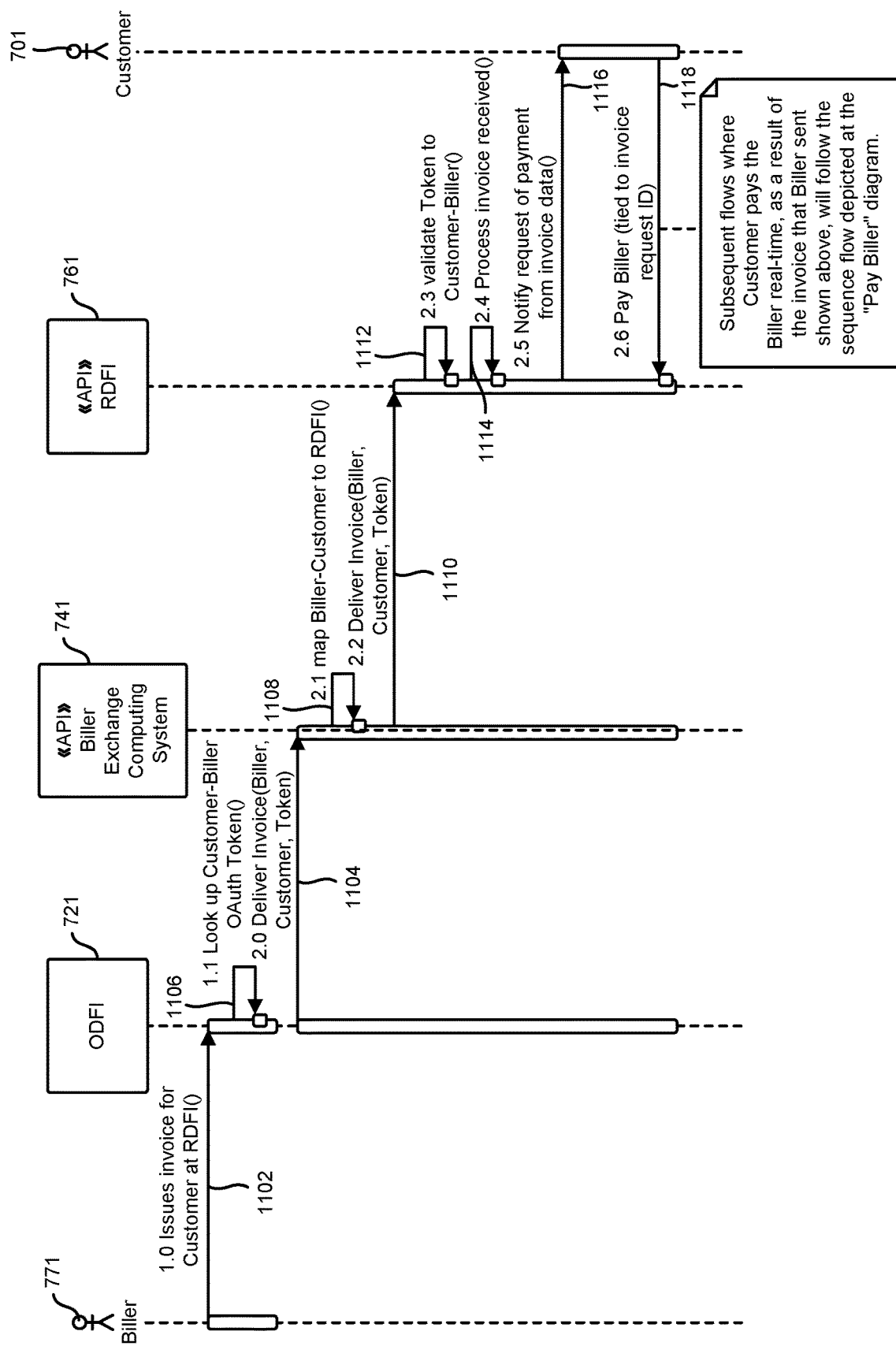
FIG. 8C is a sequence flow diagram for a bill presentment process using an example API, according to an example embodiment.
Figure 9A:
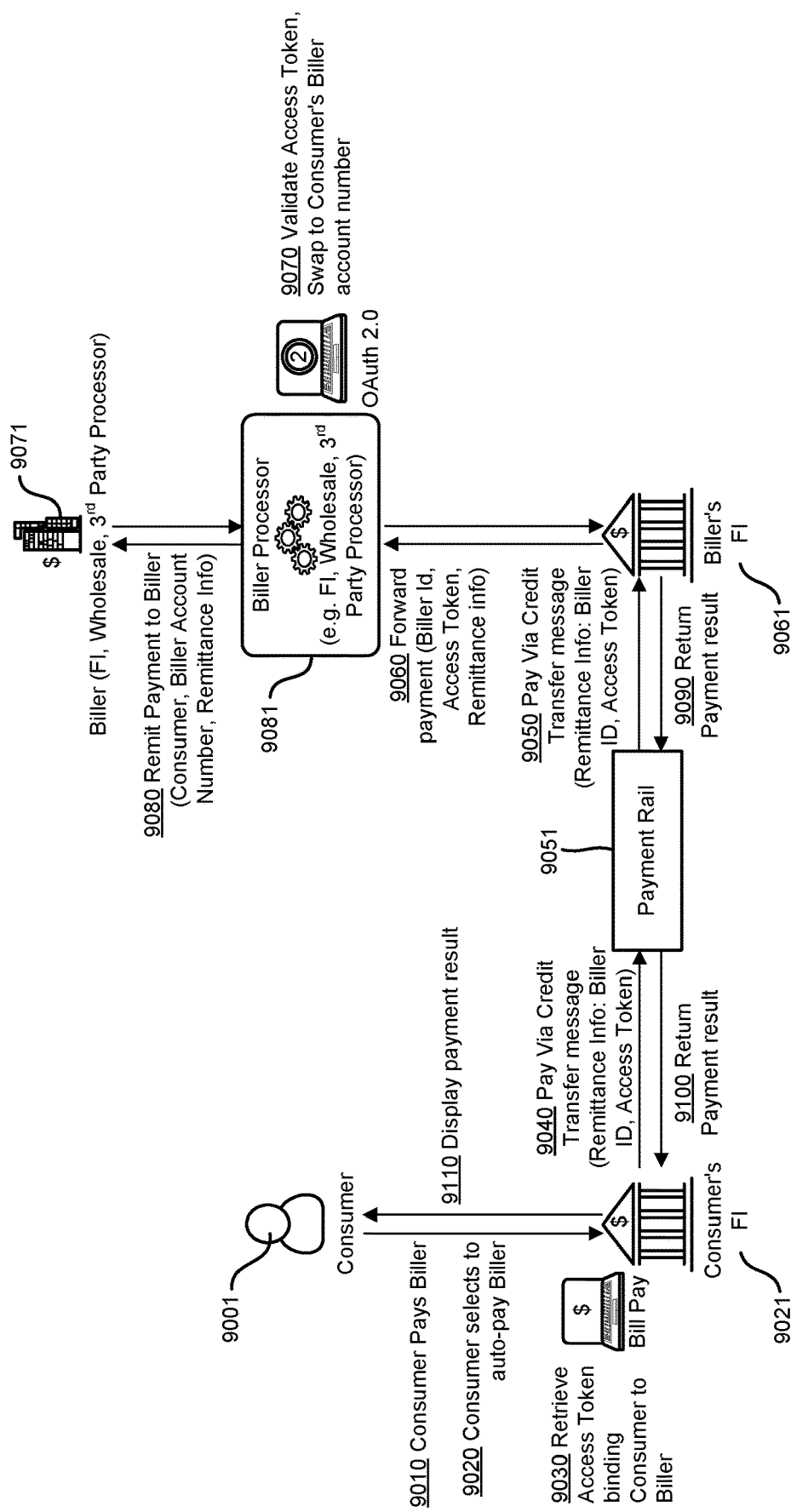
FIG. 9A shows the computing systems involved in an example payment process enabled by the biller exchange computing system.
Figure 9B:
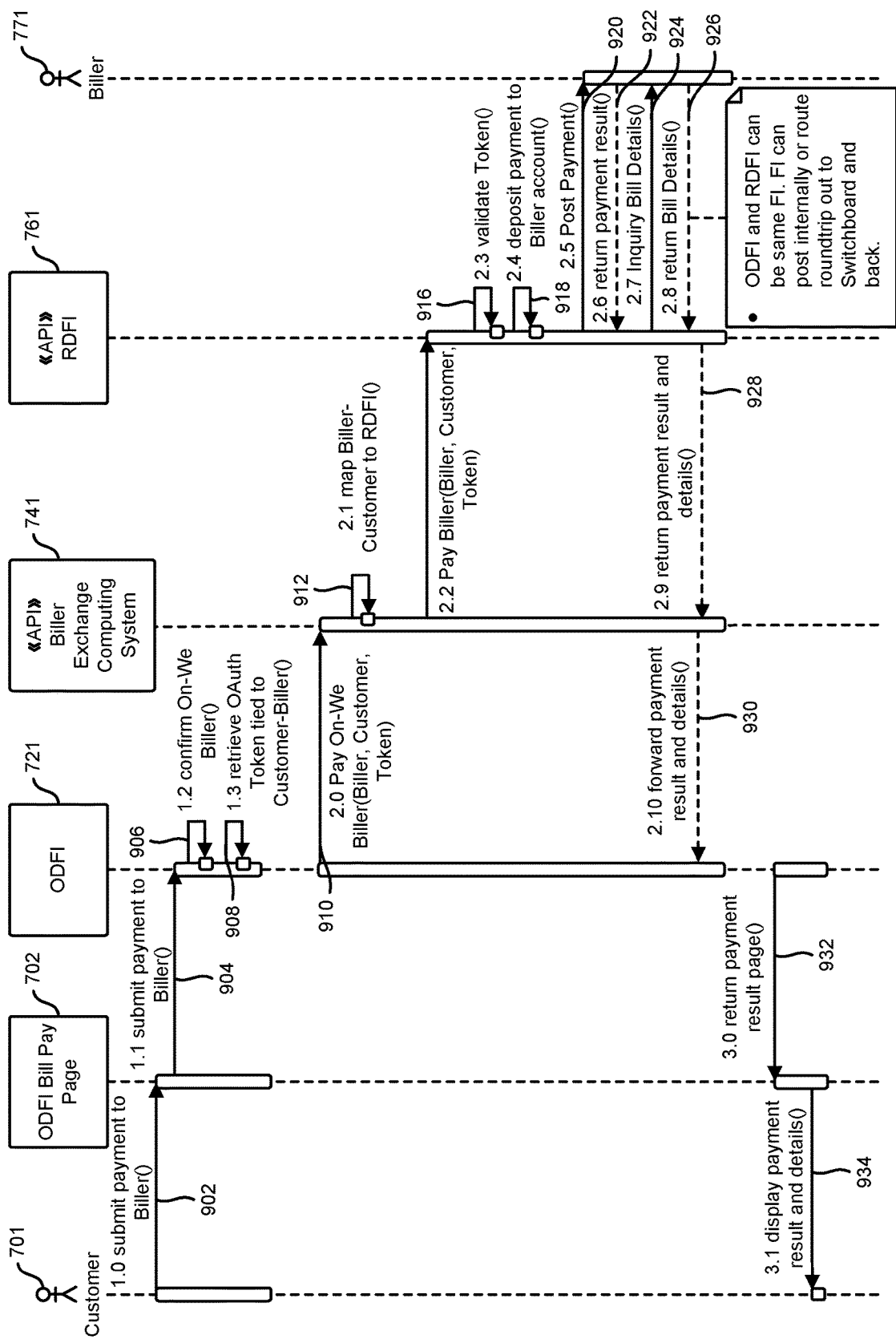
FIG. 9B is a sequence flow diagram for payment processing using an example API, according to an example embodiment.
Figure 10A:
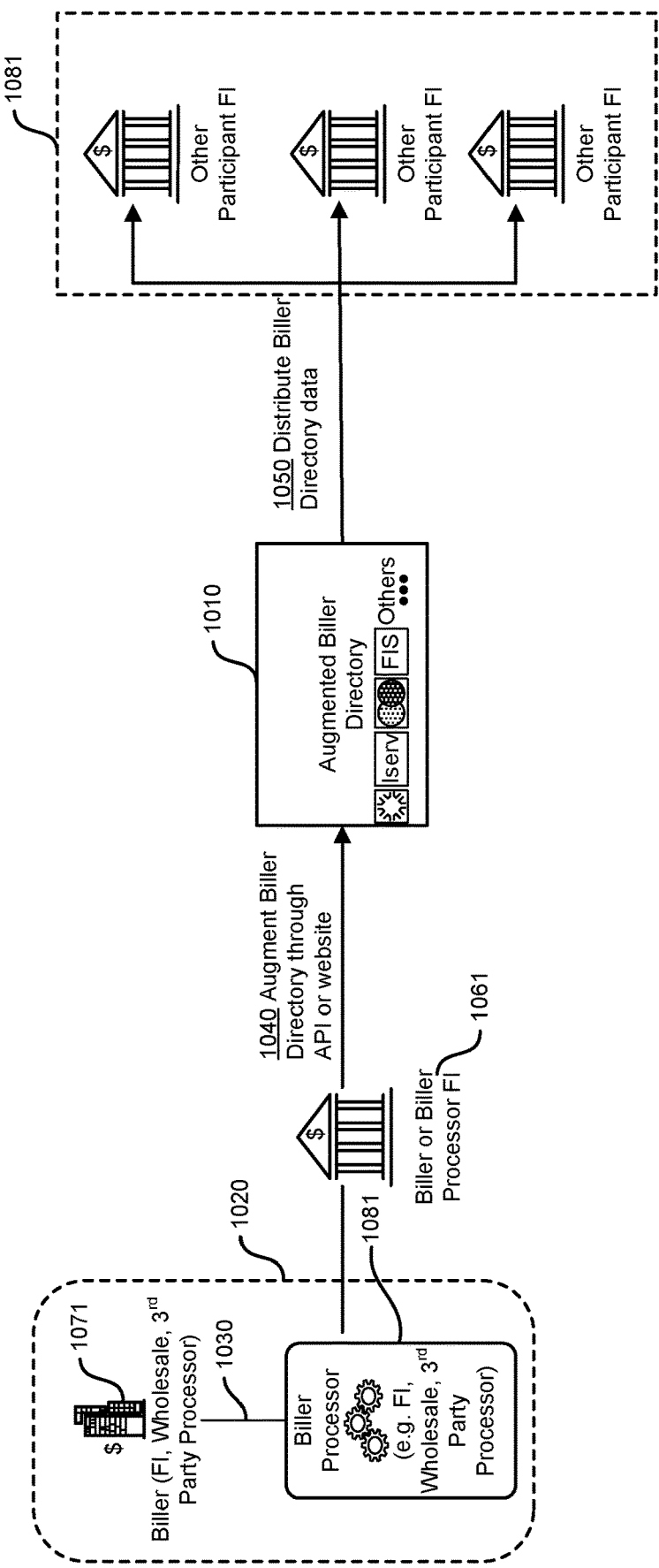
FIG. 10A shows the computing systems involved in the biller registration process enabled by the biller exchange computing system.
Figure 10B:
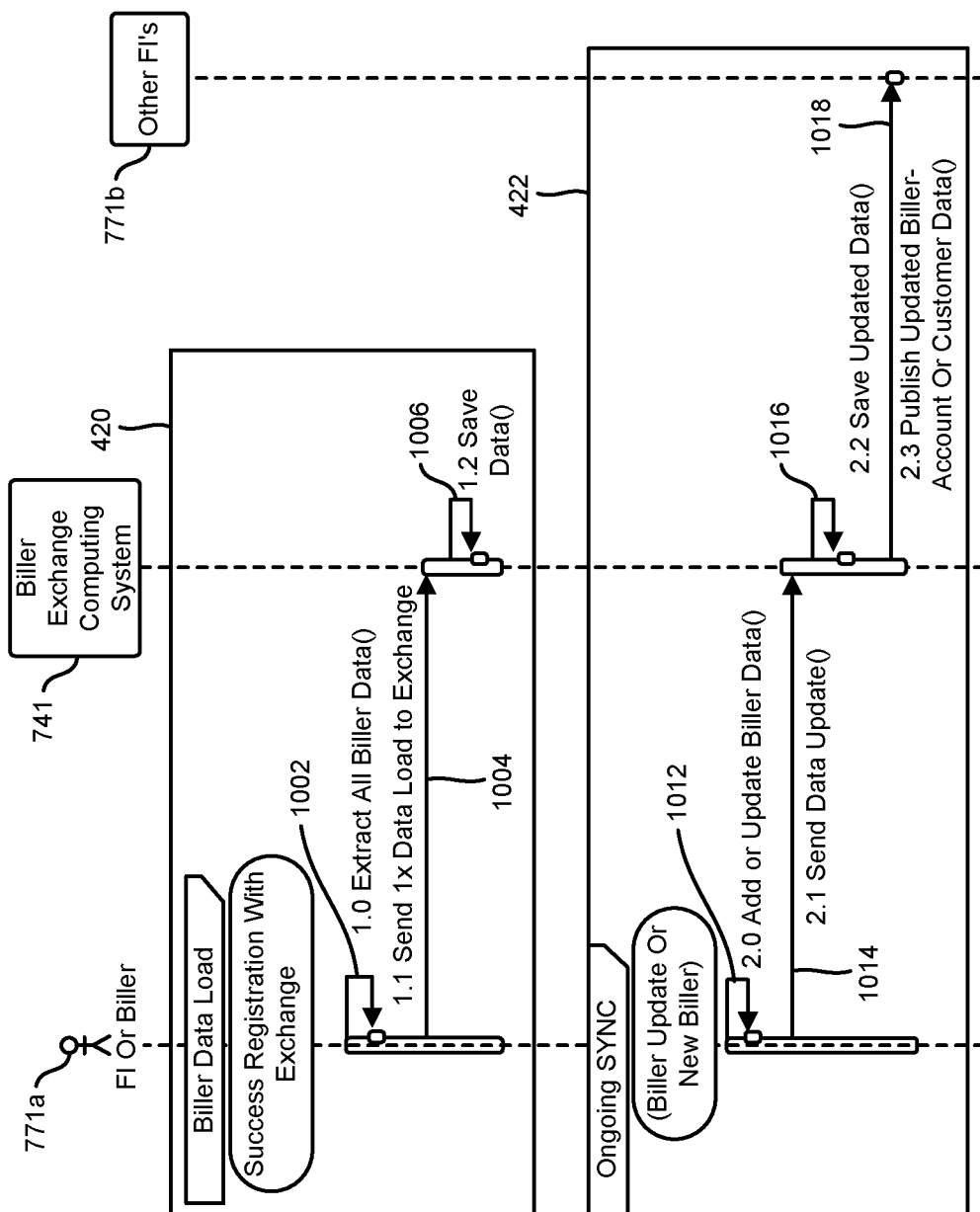
FIG. 10B is a sequence flow diagram for a biller directory synchronization process using an example API, according to an example embodiment.

Referring now to FIGS. 7A-10B, computing systems sand sequence flow diagrams that illustrate various aspects of the payments engine are shown. FIGS. 7A-7E show the computing systems involved in the biller enrollment process, according to an example embodiment, and APIs therefor. During the biller enrollment process, a biller and/or the biller's financial institution sign up to the exchange and are mapped to a particular customer and/or account (product). FIGS. 8A-8C show the computing systems involved in the bill inquiry and presentment process, according to an example embodiment, and APIs therefor. During the bill inquiry and presentment process, a customer receives (either in a push or pull fashion) an invoice from a biller that is signed up to the exchange. FIGS. 9A and 9B show the computing systems involved in a payment process, according to an example embodiment, and APIs therefor. During the payment process, a payment is originated from an originating financial institution to the receiving financial institution, where the receiving financial institution is determined by the payments engine based on information contained in the biller directory and where the payment transaction may be based on data from a biller invoice routed through the exchange. FIGS. 10A and 10B show the computing systems involved in a biller directory replication and/or synchronization, and the APIs therefor. During the biller directory replication and/or synchronization, payment routing information (such as biller information, financial institution information, biller processor information, etc.) is standardized across computing systems of the participants in the payments ecosystem.

In the example embodiments of FIGS. 7A-10B, data is exchanged between various computer-implemented entities shown in FIGS. 1-6. For example, the customer 701 of the sequence diagrams refers to the computing device 354 of the customer 101 of the originating financial institution (herein, although the acronym "ODFI" is used, it will be understood that payments may also be made via payment rails other than ACH—for example, via TCH RTP®). The ODFI bill page 702 refers to a bill page web interface provided by the computing system 320 of the ODFI. The ODFI computing system 721 refers to other, predominantly backend, operations performed by the computing system 320 of the ODFI. The biller exchange computing system 741 refers to the biller exchange computing system 330, including APIs provided by the computing system 330. The RDFI computing system 761 refers to the computing system 320 of the receiving financial institution, including APIs provided by the computing system 320. The biller 771 refers to the biller computing system 304 used by the biller, including APIs provided by the computing system 304. In some embodiments, the computing systems further include biller processor computing systems. In embodiments where biller processor computing systems are not shown, one of skill will appreciate that biller processor computing system functions may be performed by the exchange computing systems, biller computing systems, and/or the biller's financial institution computing systems.

As shown, data is exchanged between the entities of FIGS. 7A-10B using function calls according to an API of each respective computing system. For example, function calls made to the ODFI computing system 721 are made by calling the public functions exposed by the financial institution API 322 to external systems with which the ODFI computing system 721 is communicatively coupled. Function calls made to the biller exchange computing system 741 (e.g., 712, 744, etc.) are made by calling the public functions exposed by the exchange API 332 to external systems with which the biller exchange computing system 741 is communicatively coupled. Function calls made to the RDFI computing system 761 (e.g., 726, etc.) are made by calling the public functions exposed by the biller API 310 to external systems with which the RDFI computing system 761 is communicatively coupled.

Figure 7A:
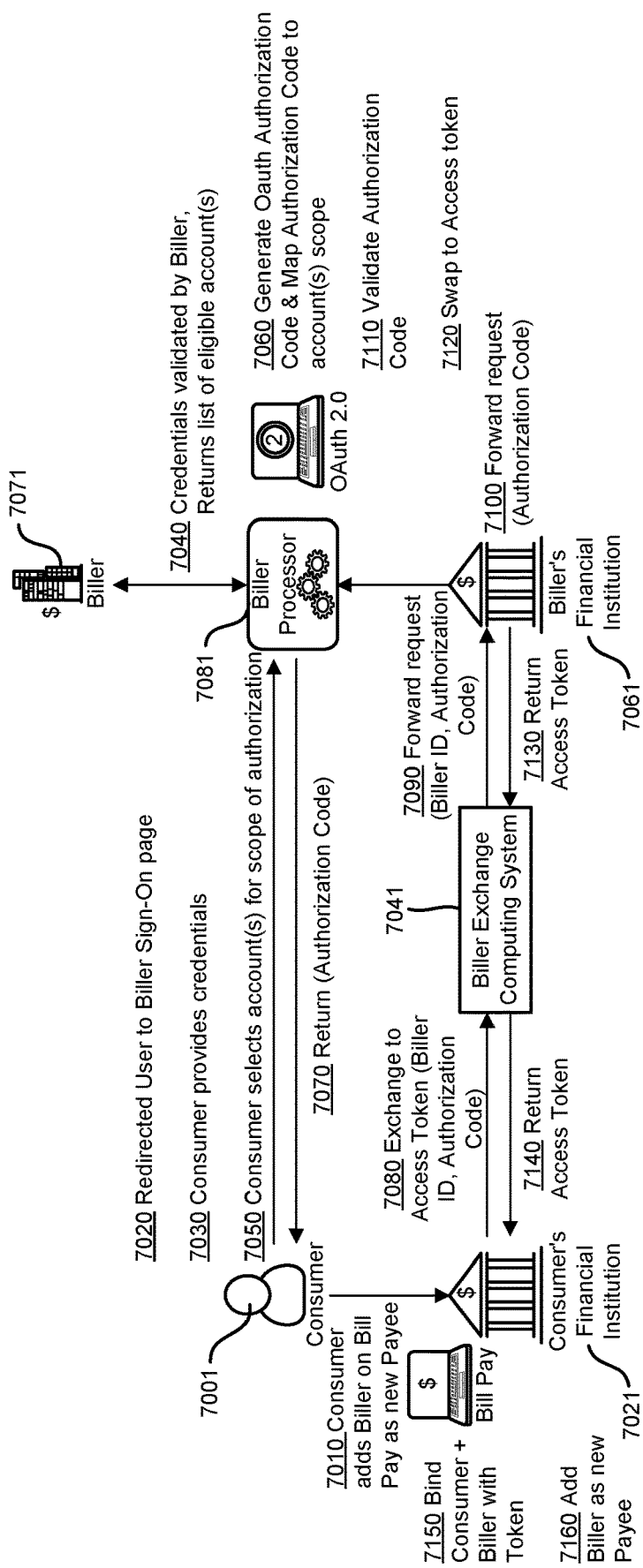
FIG. 7A shows the computing systems involved in the biller enrollment process enabled by the biller exchange computing system.
Figure 7B:
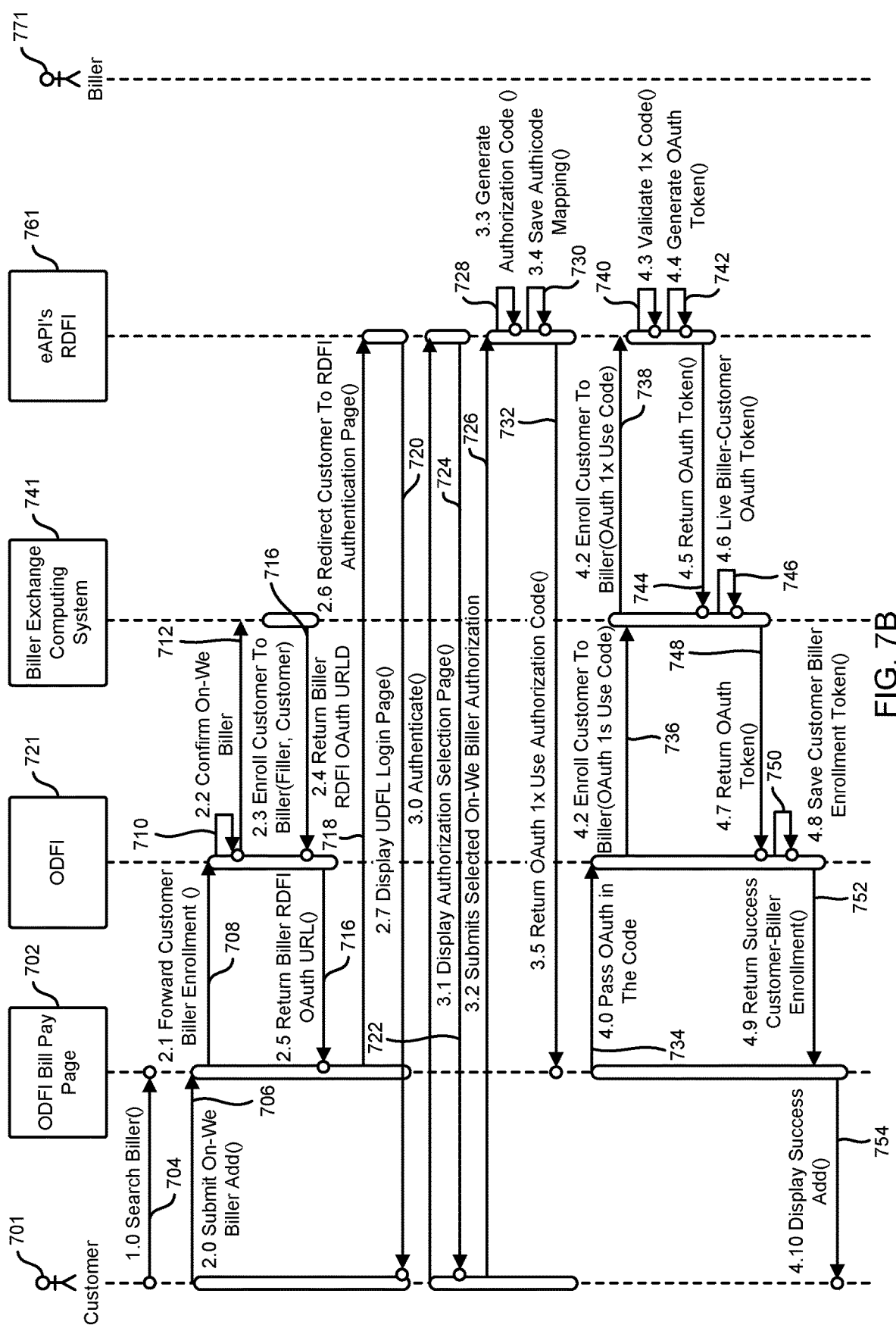
FIG. 7B is a sequence flow diagram for biller enrollment using an example API, according to an example embodiment.
Figure 7C:
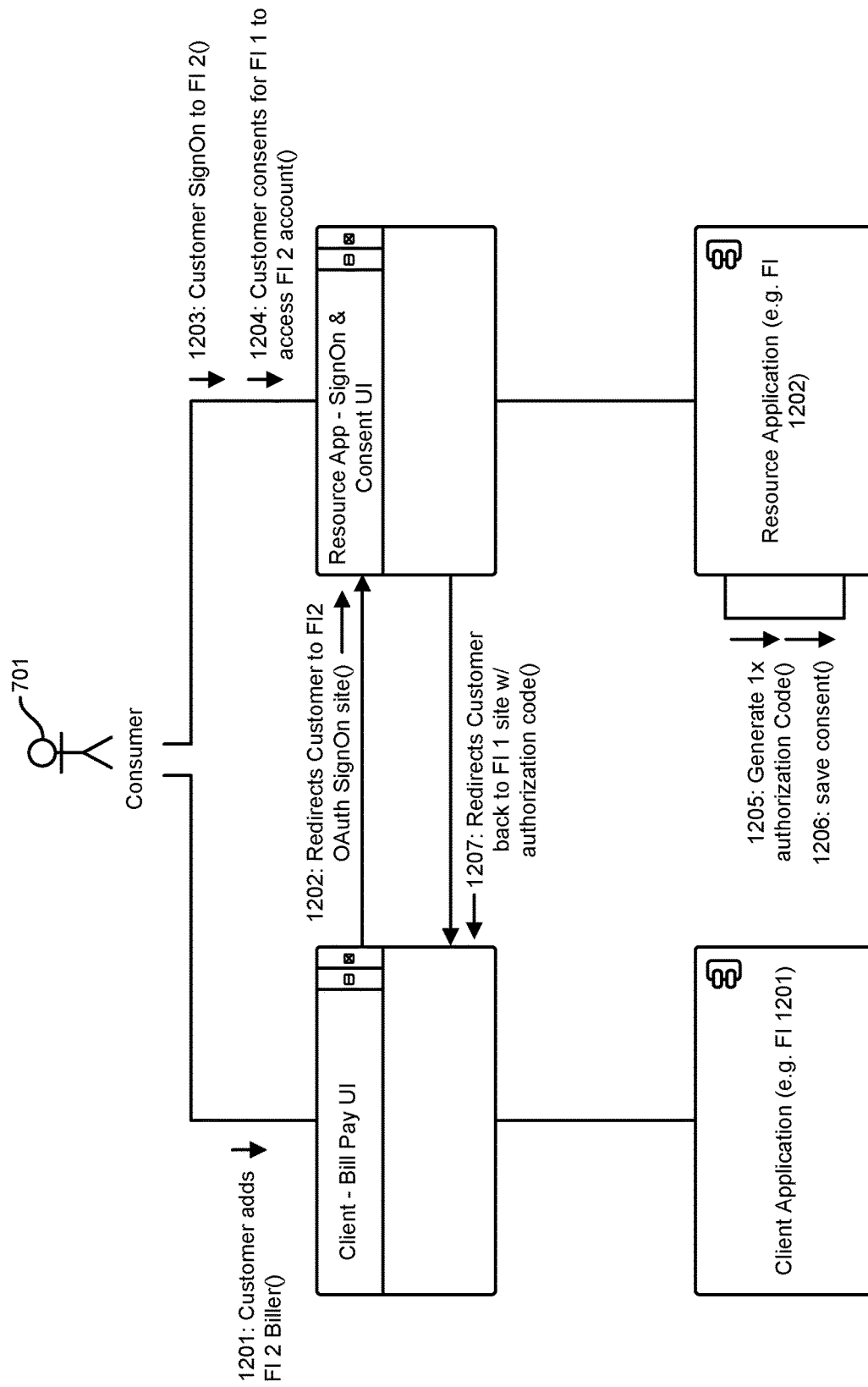
FIG. 7C is a sequence flow diagram illustrating an enrollment operation with browser to browser customer consent.
Figure 7D:
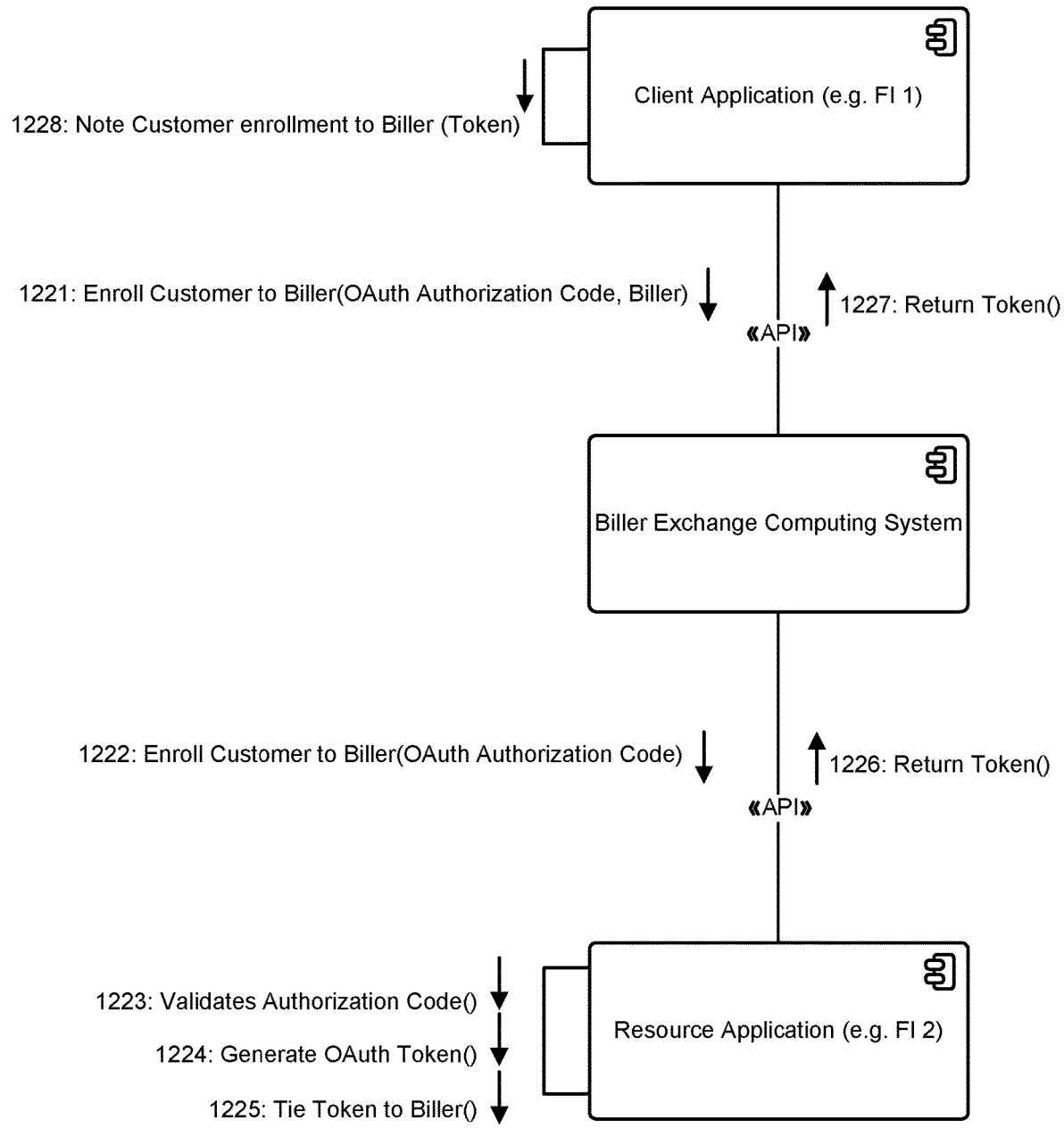
FIG. 7D is a block diagram illustrating an enrollment operation with server to server token retrieval for preparing the example data store of FIG. 5.
Figure 7E:
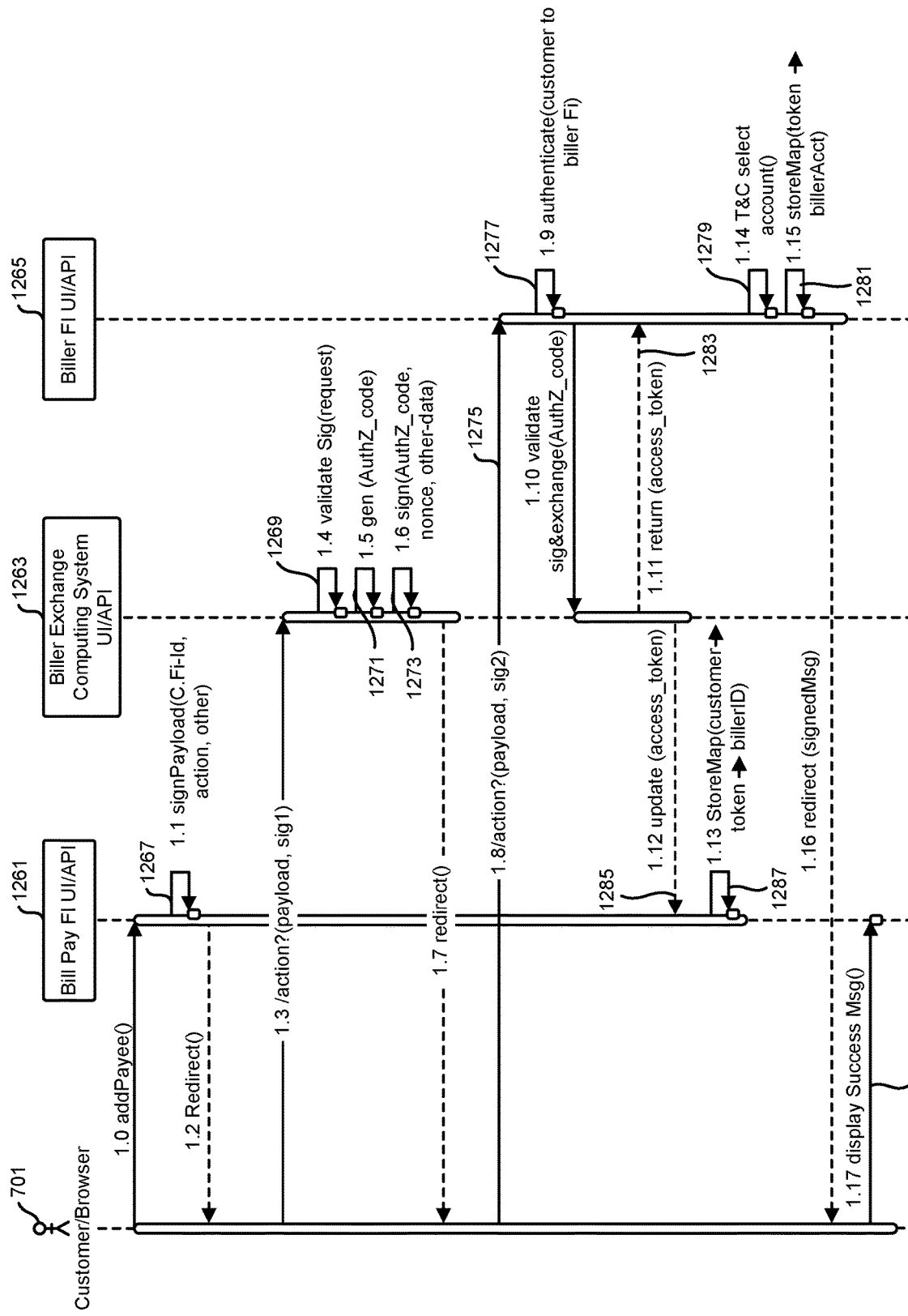
FIG. 7E is a block diagram illustrating an enrollment operation integrating small financial institutions or biller or both for preparing the example data store of FIG. 5.

FIGS. 7A-7E show the computing systems involved in the biller enrollment process, according to an example embodiment, and APIs therefor. FIG. 7A shows the computing systems involved in the biller enrollment process facilitated by the biller exchange computing system. FIG. 7B is a sequence flow diagram for biller enrollment using an example API, according to an example embodiment. FIG. 7C is a sequence flow diagram illustrating an enrollment operation with browser to browser customer consent. FIG. 7D is a block diagram illustrating an enrollment operation with server to server token retrieval for preparing the example data store of FIG. 5. FIG. 7E is a block diagram illustrating an enrollment operation integrating small financial institutions or billers or both for preparing the example data store of FIG. 5.

In FIG. 7A, the infrastructure includes consumer 7001 operating a consumer computing device, consumer's financial institution 7021 operating a financial institution computing device, biller 7071 operating a biller computing device, biller processor 7081 operating a biller processor computing device, and biller financial institution 7061 operating a biller financial institution computing device. One of skill will appreciate that computing devices may be server devices, client devices, mobile devices, etc. as appropriate. The participants in the payments ecosystem share information and perform transactions enabled by the biller exchange computing system 7130. In an example embodiment, the biller exchange computing system 7130 may be operated by a consortium of financial institutions, and the consumer's financial institution 7021, biller's financial institution 7061, biller processor 7081, etc. may be members thereof.

The participants in the payments ecosystem exchange data and perform transactions via a set of APIs that support interoperability among the participant systems. More particularly, in an example embodiment, the consumer 7001 may use the consumer computing device to initiate the process of adding a consumer's biller 7071 via the exchange, thereby creating a new mapping between the consumer 7001 and one or more consumer accounts with the biller 7071. For example, a user with a new mortgage and credit card account at Bank A may hold a checking account at Bank B. The user may use Bank B's Bill Pay user interface to set up automatic bill inquiry, bill presentment, and payment features to Bank A using the exchange. The new mapping is secured using tokenization—for example, via an OAuth token, which may include or be stored relationally to customer information, biller identifier, biller account identifier, biller processor identifier, OAuth authorization scope information, pre-scheduled payment information, etc. Once a mapping is established, the biller 7017 is considered enrolled (relative to the consumer and the consumer's particular product with the biller). Some aspects of an example API library and EDI messages related thereto are discussed in the table below:

TABLE 1

Example EDI Messages and API Functionality (Enrollment)

| API Identifier | Descriptor |
|---|---|
| 7010 | Consumer adds a Biller as a Payee on their FI's computing system's Bill Pay UI |
| 7020 | Consumer's FI computing system checks its Biller Directory received from On-We Exchange computing system to retrieve the OAuth Authorization URL and redirects Consumer there |

TABLE 1-continued

Example EDI Messages and API Functionality (Enrollment)

| API Identifier | Descriptor |
|---|---|
| 7030 | Consumer provides username/password credentials on Sign-On page hosted by Biller Processor computing system |
| 7040 | Credentials are forwarded and validated by Biller computing system, which returns the eligible account(s) that Consumer can authorize consent on |
| 7050 | Consumer selects the account(s) for the scope of OAuth authorization consent (e.g., read, write, selectively enabled read/write by functionality, selectively enabled read/write by data element access level/confidentiality, etc.) |
| 7060 | Biller Processor computing system generates Authorization Code and maps it to Consumer's selected account(s) scope of consent |
| 7070 | Biller Processor computing system navigates User back to Bill Pay return URL, along with Authorization Code |
| 7080 | Consumer's FI computing system exchanges Authorization Code to Access Token with Biller's FI computing system by invoking On-We Exchange's "Enroll" API, passing Biller ID and the Authorization Code received from Biller Processor computing system |
| 7090 | On-We Exchange computing system processes the "Enroll" request, internally maps the Biller ID received to the Biller's FI, and invokes Biller's FI comping system's "Enroll" API (forwarding the Biller ID and Authorization Code received) |
| 7100 | Biller's FI computing system forwards the Authorization Code to Biller Processor computing system for validation |
| 7110 | Biller Processor computing system validates the Authorization Code received |
| 7120 | If validation is successful, Biller Processor computing system generates OAuth Access Token to swap with the Authorization Code |
| 7130 | Biller's FI computing system returns the Access Token in its "Enroll" API response back to On-We Exchange |
| 7140 | On-We Exchange computing system forwards the same result back on its "Enroll" response to Consumer's Bank computing system |
| 7150 | Consumer's FI computing system Bill Pay saves and binds the Access Token to the Biller and Consumer |
| 7160 | Consumer's FI computing system Bill Pay displays a successful Biller enroll to Consumer message via UI |

In FIG. 7B, the customer 701 sets up bill pay for an off-us non-banking biller. In other words, the customer uses a first (ODFI) bank, and the biller uses a second (RDFI) bank. As shown, a biller processor is not used, but one of skill will appreciate that some of the functions performed by the computing systems shown may be performed by a biller processor computing system and/or a biller processor's financial institution computing system. The customer 701 may search for a known biller on the ODFI bill pay page 702 at step 704. At step 706, the customer 701 may submit a request to add an on-we biller to the customer's list of payees on the ODFI bill pay page 702. The ODFI bill pay page 702 forwards the biller enrollment request from the customer 701 to the ODFI computer system 721 at step 708. The ODFI computing system 721 confirms the on-we biller at step 710 and enrolls the customer 701 to the biller profile in the biller exchange computing system 741 at step 712. At step 716, the biller exchange computing system 741 returns the biller RDFI OAuth URL to the ODFI 721, which further returns the biller RDFI OAuth URL to the ODFI Bill pay page 702. Afterwards, on the ODFI Bill pay page 702, the customer 701 may redirect the customer 701 to RDFI authentication page at 718 and access RDFI 761. The RDFI 761 may display the RDFI login page to the customer 701 at step 720.

After authentication, the customer 701 may then interact with RDFI 761 through the biller exchange computing system 741. For example, the customer 701 may request authentication at step 722. The RDFI 761 may then display authorization selection page to the customer 701 at step 724. The customer 701 may submit selected on-we biller authorization at step 726. The RDFI 761 may then generate authorization code at step 728. At step 730, the RDFI 761 may save the mapping of the authorization codes. At step 732, a one-time OAuth authorization code is returned to the ODFI bill pay page 702.

At step 734, the ODFI bill pay page 702 passes the OAuth authorization code to the ODFI 721. The ODFI 721 may enroll the customer 701 to the biller 771 in the biller exchange computing system 741 at step 736. In some embodiments, the biller exchange computing system 741 may forward the customer enrollment to the RDFI 761 at step 738, for example, without saving or otherwise interacting with the one-time authorization code. After validation, the RDFI 761 may validate the authorization at step 740 and generate an OAuth token at step 742. The RDFI 761 returns the OAuth token to the biller exchange computing system 741 at step 744. The biller exchange computing system 741 provides a live biller-customer OAuth token at step 746 and forwards or returns the OAuth token to the ODFI 721 at step 748. The ODFI 721 saves the customer biller enrollment token at step 750 and sends a confirmation of success of customer-biller enrollment notification to the ODFI bill pay page 702 at step 752. At step 754, the ODFI bill pay page 702 displays an enrollment success notification to the customer 701.

FIG. 7C is a block diagram illustrating an enrollment operation with browser to browser customer consent for preparing the example data store of FIG. 5. As shown, a biller processor is not used, but one of skill will appreciate that some of the functions performed by the computing systems shown may be performed by a biller processor computing system and/or a biller processor's financial institution computing system. At step 1201, the customer may add a biller associated with a different financial institution using a client end bill pay user interface. At step 1202, the bill pay user interface redirects the customer to an OAuth sign-on web-site of the biller's financial institution. For example, the user interface provides a biller's OAuth resource application sign-on or consent site URL. At step 1203, the customer 701 may sign on to the biller's financial institution.

At step 1204, the customer 701 may consent to allow his own financial institution to access the account created in the sign-on financial institution. After signing on and providing the consent at the OAuth web site, the resource application of the biller's financial institution may generate a one-time authorization code at step 1205. The resource application may save the consent from the customer 701 for future reference at step 1206. The customer 701 is redirected and returned to the bill pay user interface with authorization code at step 1207. As such, both the client's bill-pay site and the biller's OAuth sign-on site may whitelist the URLs therebetween, allowing OAuth to redirect information flow between these two endpoints. In some embodiments, the redirecting URLs may be shared between the end points through new data attributes in the biller directory exchange systems as disclosed herein.

FIG. 7D is a block diagram illustrating an enrollment operation with server to server token retrieval for preparing the example data store of FIG. 5. As shown, a biller processor is not used, but one of skill will appreciate that some of the functions performed by the computing systems shown may be performed by a biller processor computing system and/or a biller processor's financial institution computing system. In this embodiment, a customer may be enrolled via the client application to associate with a biller using an OAuth authorization code at step 1221. For example, this may be achieved through both the client bill pay application and the biller resource application that are integrated via an enroll API at the biller exchange computing system as disclosed. The biller exchange computing system may abstract and mediate the OAuth Token Retrieval request from the Client Bill Pay Application to the Biller Resource Application end points. As such, the one-time integration (enrollment) with the biller exchange computing system provides the technical benefit of abrogating the need for each of the customer and biller's end point applications to implement multiple direct backend authorizations with each other every time a customer performs a presentment inquiry, schedules a transaction, etc. At step 1222, a second enrollment process, which includes swapping of a temporary authorization code for a token, can also be performed without including biller information in the API messages.

At steps 1223-1225, the resource application may be in connection with a public enroll API that allows the biller exchange computing system 210 to pass the token retrieval request to biller. In such a situation, the biller exchange computing system 210 may forward the OAuth token returned from this biller API to the client bill pay application. At step 1223, authorization code is validated by the resource application. At step 1224, the resource application may generate an OAuth token in response to a successful validation of the authorization code. At step 1225, the generated OAuth token may be tied to the biller for future transaction processes. At step 1226, the generated OAuth token is returned through the biller exchange computing system 210 to the next step. At step 1227, the OAuth token is returned, in a forwarding manner, to the client application. The client application then saves the OAuth token to note the customer enrollment with the biller at step 1228. In this manner, the biller exchange computing system may bridge the token requests and responses between the client application and resource application, facilitating real-time operations.

FIG. 7E is a block diagram illustrating an enrollment operation for integrating small financial institutions or billers or both for preparing the example data store of FIG. 5. As shown, a biller processor is not used, but one of skill will appreciate that some of the functions performed by the computing systems shown may be performed by a biller processor computing system and/or a biller processor's financial institution computing system.

As shown in the embodiment of FIG. 7E, the biller exchange computing system API 1263 performs some or all of the token generation functions that may ordinarily be performed by biller processor computing systems for larger billers (e.g., as shown in FIG. 7A). Often, small financial institutions or billers may not have adequate resources or technology setup to implement an OAuth API and/or tokenization infrastructure. FIG. 7E provides another embodiment of enrollment token generation supported by the biller exchange computing system for such situations. A customer may access the biller exchange computing system API 1263 via its bill pay API 1261 associated with the customer's financial institution. The biller exchange computing system API 1263 may handle the responsibilities of OAuth authorization code and token generation in place of a tokenization infrastructure of a biller processor computing system. For example, a customer device may initiate a small biller enrollment process. The customer's financial institution may send an electronic message that includes a customer signature payload. The customer signature may comprise information needed to identify the customer and/or the customer's financial institution to the biller. The message may be routed through the exchange computing system API 1263. The exchange computing system API 1263 may, in response to a validation request, validate a signature at 1269 (e.g., confirm that a customer is associated with the customer's financial institution), generate an authorization code at 1271, and sign the generated authorization code 1273. The authorization code may be forwarded to a biller computing system, where the authorization code may be authenticated at 1277 (automatically or by an operator) to confirm that the biller will accept electronic remittances initiated by the customer's financial institution. If these operations are performed automatically, the biller may use the biller API 1265 to perform authentication of the authorization code.

The biller may use the biller API 1265 to invoke an API exposed by the biller exchange computing system at step 1277. The biller exchange computing system may swap out the authorization code for an access token (e.g., one generated by a token generator) and send the access token back to the biller computing system, where the token may be stored in storage media relationally to the customer and/or biller account information. This allows for biller account selection at step 1279. The access token may be a numeric or alphanumeric entity (including special characters) and may include a biller identifier, a customer identifier, a biller's product identifier, payment information (e.g., a monthly payment amount), custom security policy information required by the biller (e.g., customer challenge questions and answers, customer PIN code, etc.). In some embodiments, the token does not necessarily include the customer's login information for the biller's computing system, but may be used as a secondary authentication mechanism through the biller exchange computing system in the event the customer forgets the login credentials and is unable to reset them via the biller's computing system. For instance, the token may be decoded to provide challenge questions to the customer and request responses, to request a PIN code, etc. This provides the technical benefit of augmented system and data security.

The bill pay API 1261 also saves the token relationally to the customer and/or biller identifier for future processing at step 1287 and sends a confirmation notification to the customer 701 at step 1289.

FIGS. 8A-8C show the computing systems involved in the bill inquiry and presentment process, according to an example embodiment, and APIs therefor. FIG. 8A shows the computing systems involved in the bill inquiry and/or bill presentment process facilitated by the biller exchange computing system. Bill inquiry may be initiated by the consumer. Bill presentment may be initiated by the biller. FIG. 8B is a sequence flow diagram for bill inquiry and/or bill presentment using an example API, according to an example embodiment. FIG. 8C is a sequence flow diagram for the bill presentment process using an example API, according to an example embodiment.

In FIG. 8A, the infrastructure includes consumer 8001 operating a consumer computing device, consumer's financial institution 8021 operating a financial institution computing device, biller 8071 operating a biller computing device, biller processor 8081 operating a biller processor computing device, and biller financial institution 8061 operating a biller processor computing device. One of skill will appreciate that computing devices may be server devices, client devices, mobile devices, etc. as appropriate. The participants in the payments ecosystem share information and perform transactions enabled by the biller exchange computing system 8041. In an example embodiment, the biller exchange computing system 8041 may be operated by a consortium of financial institutions, and the consumer's financial institution 8021, biller's financial institution 8061, biller processor 8081, etc. may be members thereof.

The participants in the payments ecosystem exchange data and perform transactions via a set of APIs that support interoperability among the participant systems. More particularly, in an example embodiment, the consumer 8001 may use the consumer computing device to initiate the process obtaining the latest balance, invoice, and other payment-related information from a particular biller 8071. Some aspects of an example API library and EDI messages related thereto are discussed in the table below:

TABLE 2A

Example EDI Messages and API Functionality (Consumer-Initiated Bill Inquiry)

| API Identifier | Descriptor |
| --- | --- |
| 8010 | Consumer requests updated Biller info via their FI's computing system Bill Pay UI |
| 8020 | Bill Pay retrieves the OAuth Access Token tied to the Consumer and Biller |
| 8030 | Consumer's FI computing system executes an "Inquire" request against On-We Exchange computing system, passing the Biller ID and Access Token |
| 8040 | On-We Exchange computing system processes the "Inquire" request, internally maps the Biller ID received to the Biller's FI, and then invokes Biller's FI computing system's "Inquire" API, forwarding the Biller ID and Access Token |
| 8050 | Biller's FI computing system forwards the request to the Biller Processor computing system |
| 8060 | Biller Processor computing system validates the Access Token tied to the Biller and Consumer, and maps this to Consumer and Biller Account Number |
| 8070 | Biller Processor computing system retrieves the latest Biller info from the Biller computing system |
| 8080 | Biller's FI computing system returns the latest Biller info to On-We Exchange computing system |
| 8090 | On-We Exchange computing system returns the latest Biller info to Consumer's FI computing system |
| 8100 | Consumer's FI computing system Bill Pay displays the latest Biller info to Consumer via UI |

In another example embodiment, the consumer 8001 may receive, via the consumer computing device, electronic notifications and invoices (e.g., as PDF documents, standardized electronic messages, etc.) from a particular biller 8071. Some aspects of an example API library and EDI messages related thereto are discussed in the table below:

TABLE 2B

Example EDI Messages and API Functionality (Biller-Initiated Bill Presentment)

| API Identifier | Descriptor |
| --- | --- |
| 8210 | Biller computing system pushes updated Biller info to their Biller Processor computing system |
| 8220 | Biller Processor computing system maps the Biller and Consumer to an Access Token |
| 8230 | Biller Processor computing system forwards updated Biller info to Biller's FI computing system |
| 8240 | Biller's FI computing system invokes On-We Exchange to update Biller Info to Consumer, passing the Biller ID and Access Token |

TABLE 2B-continued

Example EDI Messages and API Functionality (Biller-Initiated Bill Presentment)

| API Identifier | Descriptor |
|---|---|
| 8250 | On-We Exchange computing system passes the updated Biller info to the Consumer's FI computing system |
| 8260 | Consumer's FI computing system Bill Pay maps the Access Token and Biller ID to its specific Consumer |

In FIG. 8B, the customer 701 inquires about a bill from the biller 771. On the ODFI bill pay page 702, the customer 701 may send request to view bill details at step 802. The ODFI bill pay page 702 submits the request to view bill details to the ODFI 721 at step 804. In response, the ODFI 721 retrieves the customer-biller OAuth token saved from previous enrollment at step 806. The ODFI 721 may, in a continuing or a different session, send an inquiry to the exchange 741 at step 808. The biller exchange computing system 741 maps the biller-customer to RDFI 761 and forwards the inquiry to the biller 771 at step 812. The RDFI 761 validates the token at step 816 and maps the token to biller account at step 814. The RDFI 761 then sends the inquiry regarding the biller account to the biller 771 at step 818. The biller 771, in response to the inquiry, may automatically and/or instantly return a result to the RDFI 761 at step 820. The RDFI 761 ant the biller exchange computing system 741 may forward the result at steps 822 and 824 respectively, to the ODFI 721. The ODFI 721 then displays the bill details on the ODFI bill pay page 702 at step 826. The ODFI bill pay page 702 then displays the bill details to the customer 701 at step 828.

In FIG. 8C, a biller 771 may deliver an invoice or bill to the customer 701. The process or method includes step 1102 where the biller 771 issues an invoice to an ODFI 721 for the customer 701 at an RDFI. The ODFI 721 looks up a corresponding customer-biller OAuth Token and delivers the invoice to the biller exchange computing system 741 at step 1104. The biller exchange computing system 741 maps the biller-customer relationship to RDFI and delivers invoice to RDFI 761 at step 1110. The RDFI 761 is operable to validate the token and process the received invoice at step 1114. The RDFI 761 may then notify the customer 701 the billing request from the invoice data at step 1116. The customer 701 may then pay the biller 771 in response to the notification received from the RDFI 761 at step 1118.

FIGS. 9A and 9B show the computing systems involved in a payment process, according to an example embodiment, and APIs therefor. FIG. 9A shows the computing systems involved in an example payment process facilitated by the biller exchange computing system. FIG. 9B is a sequence flow diagram for payment processing using an example API, according to an example embodiment.

In FIG. 9A, the infrastructure includes consumer 9001 operating a consumer computing device, consumer's financial institution 9021 operating a financial institution computing device, biller 9071 operating a biller computing device, biller processor 9081 operating a biller processor computing device, and biller financial institution 9061 operating a biller processor computing device. One of skill will appreciate that computing devices may be server devices, client devices, mobile devices, etc. as appropriate. The participants in the payments ecosystem share information and perform transactions enabled by the biller exchange computing system 9051. In an example embodiment, the biller exchange computing system 9051 may be operated by a consortium of financial institutions, and the consumer's financial institution 9021, biller's financial institution 9061, biller processor 9081, etc. may be members thereof.

The participants in the payments ecosystem exchange data and perform transactions via a set of APIs that support interoperability among the participant systems. More particularly, in an example embodiment, the consumer 9001 may use the consumer computing device to initiate or schedule a payment to particular biller 8071. In some embodiments, a payment transaction may be based at least in part on the billing information received from the biller 8071 via the exchange via the bill inquiry and/or bill presentment API functions. For example, certain fields of the payment transaction, such as a payment date, payment amount, memo line, reference account number, reference invoice identifier, etc. may be pre-populated. In an example embodiment, the FI computing system of the consumer 9001 initiates a transmission of a remittance to the biller computing system through a payment rail, such as TCH RTP®. In some embodiments, a Credit Transfer message (PACS 008) is used to transmit remittance information. The PACS 008 message may be generated by the API according to a predetermined PACS format and further augmented with exchange-specific information indicating that the payment is enabled via the exchange. For example, the PACS 008 message may contain an indicator for financial institutions to recognize that the payment is made through the exchange, an exchange identifier, an encoded identifier of a computing resource where the biller exchange computing system 9051 stores the binding information for the corresponding enrollment mapping, a unique identifier assigned by the biller exchange computing system 9051 for a specific payment being made on a specific bill (to enable a technical benefit of the biller computing system automatically posting the payment received via the exchange to a particular invoice, etc.). The Payment Rail computing system may route the real-time payment remittance to the Biller's FI computing system as part of the PACS 008 or similar message, passing the biller id and the OAuth token in addition to the remittance data. In some embodiments, the OAuth token is included in the message. Some aspects of an example API library and EDI messages related thereto are discussed in the table below:

TABLE 3

Example EDI Messages and API Functionality (Payments)

| API Identifier | Descriptor |
|---|---|
| 9010 | Consumer requests to pay their Biller via their FI computing system Bill Pay UI |
| 9020 | Consumer can select to pay their Biller manually or automatically when updated Biller info (invoice) is received |
| 9030 | Bill Pay retrieves the OAuth Access Token tied to the Consumer and Biller |
| 9040 | Consumer's FI computing system executes real-time payment remittance to the Biller's FI computing system through a payment rail, passing the Payment Remittance data: Biller ID and Access Token |
| 9050 | Payment Rail computing system routes the real-time payment remittance to the Biller's computing system, passing the Payment Remittance data: Biller ID and Access Token |
| 9060 | Biller's computing system forwards the request to the Biller Processor computing system |
| 9070 | Biller Processor computing system validates the Access Token tied to the Biller and Consumer, and maps this to Consumer and Biller Account Number |
| 9080 | Biller Processor computing system remits the payment to the Biller, passing the payment data, the Consumer, and Biller Account Number |
| 9090 | Biller's FI computing system returns the status and result of the payment to On-We Exchange computing system and/or Payment Rail Computing system |
| 9100 | On-We Exchange computing system returns the payment status and result to Consumer's FI computing system |
| 9110 | Consumer's FI computing system Bill Pay UI displays the payment status and result to Consumer |

In FIG. 9B, the customer 701 initiates/makes a payment to the biller 771. The customer 701 may submit a payment to biller on the ODFI bill pay page 702 at step 902. The ODFI bill pay page 702 submits the payment for the biller 771 to ODFI 721 at step 804. The ODFI 721 confirms the on-we biller relationship at step 906 and retrieves the OAuth token tied to the customer 701 and the biller 771 at step 908. At step 910, the ODFI 721 sends the payment toward the biller exchange computing system 741 which maps the biller-customer relationship at step 912. The biller exchange computing system 741 then forwards the payment to RDFI 761 at step 914. The RDFI 761 validates the token at step 916 and deposits a payment to the biller 771's account at step 918.

At step 920, the payment is posted to the biller 771 or a system thereof. In response, the biller 771 may return a payment result at step 922. The RDFI 761 may send an inquiry for the bill details at step 924. The biller 771 returns the inquired bill details to the RDFI 761 at step 926. In some embodiments, the ODFI 721 and the RDFI 761 as shown in FIG. 9 may be the same financial institution. In such situation, the financial institution may post the payment and/or bill details internally or route roundtrip out to the biller exchange computing system 741. The RDFI 761 then returns the payment results and bill details to the biller exchange computing system 741 at step 928. The biller exchange computing system 741 forwards the payment result and bill details to the ODFI 721 at step 930. The ODFI 721 returns the results to the ODFI bill pay page 702 at step 932. The customer 701 may then view the payment results and bill details on the ODFI bill pay page 702 at step 934.

FIGS. 10A and 10B show the computing systems involved in biller directory replication and/or synchronization, and the APIs therefor. FIG. 10A shows the computing systems involved in the biller registration process facilitated by the biller exchange computing system. FIG. 10B is a sequence flow diagram for a biller directory replication and synchronization process using an example API, according to an example embodiment.

In FIG. 10A, the infrastructure includes biller 1071 operating a biller computing device, biller processor 1081 operating a biller processor computing device, biller and/or biller processor financial institution 1061 operating a computing device, and/or other financial institutions (such as other biller and/or biller processor financial institutions, consumer financial institutions, third party processors, payment rail operators, etc.) and their respective computing devices. One of skill will appreciate that computing devices may be server devices, client devices, mobile devices, etc. as appropriate.

The participants in the payments ecosystem share information and perform transactions enabled by the augmented biller directory 1010. In some embodiments, the augmented biller directory 1010 is hosted by a biller exchange computing system (not shown). In some embodiments, the augmented biller directory 1010 is distributed in whole or in part across various computing systems. The augmented biller directory 1010 is distributed to financial institutions via data replication, data synchronization, and the like. For instance, as shown at 1010, the exchange can support an aggregated and standardized biller directory comprising billers that belong to multiple different biller directory sources that may be used across the participant systems (e.g., EBIDS, Fiserv, FIS, MasterCard, etc.). Further, as shown at 1020, each participant can augment the aggregated biller directory by registering additional billers associated with the participant financial institution, their associated biller processors, relational mappings therebetween, etc. As shown at 1030, biller registration data can include an indicator denoting whether the biller will accept real-time or batch payments. The indicator may be used by the exchange when payments are scheduled or initiated to determine the appropriate payment rail, to build a credit transfer message, etc. As shown at 1040, biller registration and/or augmentation may be performed through a user interface of a biller registration website (e.g., through data entry, batch biller data upload, etc.) and/or through an API hosted by the biller exchange computing system. As shown at 1050, the augmented biller directory is distributed, via synchronization (e.g., full download) and/or replication (e.g., partial download) to the participant computing system.

In FIG. 10B, the financial institution or biller 771a may establish secure relationships on the biller exchange computing system 741 with other financial institutions 771b. FIG. 10B further elaborates the communications 420 and 422 of FIG. 4. For one-time biller data load 420, the biller 771a may register with the biller exchange computing system 741 and allows the application to extract all biller data at step 1002. The extracted biller data is then sent to the biller exchange computing system 741 at step 1004. The biller exchange computing system 741 then saves the extracted biller data at step 1006. For recurring biller data synchronization 422, the biller 771a may provide a biller update or new biller registration by adding or updating biller data at step 1012. The application then sends the updated or new data to the biller exchange computing system 741 at step 1014. The biller exchange computing system 741 then saves the biller data at step 1016 and forward the saved updated data to other financial institutions 771b at step 1018. As such, the updated biller account information or customer data may be published at the biller exchange computing system 741 per agreement.

In some embodiments, the biller data may be periodically updated, for example, through receiving incremental update records from a computing system of the biller 771a. The biller exchange computing system 741 may maintain a cross-reference directory, which may store the biller information relationally to an immutable biller identifier generated by the biller exchange computing system computing 741 and/or relationally to the access tokens generated for individual customers of the biller 771a. Advantageously, when biller information changes, the biller identifier and/or access tokens (or parts thereof related to biller identifying information) may remain immutable.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A payer computing system associated with a payer and communicatively coupled to a biller exchange computing system, a payer computing device, a first biller computing system, and a second biller computing system, the payer computing system comprising a processing resource, a memory resource, and computer-executable instructions stored thereon and embodied in a customer-side application programming interface (API), the instructions, when executed by the processing resource, causing the payer computing system to:

receive, from the biller exchange computing system, the customer-side API, wherein the customer-side API is a distributed API that is deployed on the first biller computing system and the second biller computing system such that the distributed API validates a first payer-biller electronic authentication token and a second payer-biller electronic authentication token, the first payer-biller electronic authentication token and the second payer-biller electronic authentication token being one-time tokens configured to provide a one-time integration between their respective billers and the payer, wherein the biller exchange computing system does not locally store the first payer-biller electronic authentication token and the second payer-biller electronic authentication token;

access, by the payer computing device, a first webpage, the first webpage associated with the biller exchange computing system;

in response to a first electronic payment request received from the first biller computing system via the biller exchange computing system, the first electronic payment request comprising a previously generated first payer-biller electronic authentication token that corresponds to first payer authentication information for the first biller computing system:

validate, via the distributed API, the first payer-biller electronic authentication token;

display the first electronic payment request at the payer computing device via the first webpage;

receive, from the payer computing device via the first webpage, an instruction to initiate a payment transaction;

in response to receiving the instruction to initiate the payment transaction, cause the payment transaction to be initiated by generating electronic instructions based on biller registration data indicating whether a first biller associated with the first biller computing system accepts real-time payments or batch payments and by processing the electronic instructions to transfer an amount of funds determined based on the first electronic payment request from a source account associated with the payer to a target account associated with the first biller over a first payment rail if the first biller accepts real-time payments or over a second payment rail if the first biller accepts batch payments; and receive, from the payer computing device via a user interface of the first webpage, customer preferences regarding payment processing, the customer preferences comprising an initiating payment indicator indicating whether (i) the payer computing device will initiate future payment transactions via the first webpage or (ii) the biller exchange computing system is authorized to initiate the future payment transactions in response to receiving future electronic payment requests;

in response to the first biller having a security policy requiring an additional authentication mechanism in addition to a first authentication mechanism to access the first webpage via the payer computing device, initiate a secondary authentication mechanism comprising:

decoding the first payer-biller electronic authentication token to provide challenge questions;

in response to decoding the first payer-biller electronic authentication token, requesting additional payer authentication information other than the first payer authentication information via the challenge questions; and in response to receiving and authenticating the additional payer authentication information, permitting access to the biller exchange computing system; and in response to a second electronic payment request received from the second biller computing system via the biller exchange computing system, wherein the second electronic payment request comprises a previously generated second payer-biller electronic authentication token that corresponds to second payer authentication information for the second biller computing system:
- validate, via the distributed API, the second payer-biller electronic authentication token; and
- display the second electronic payment request at the payer computing device via the first webpage;

display, via the user interface of the first webpage, a sequence of screens, each screen of the sequence of screens corresponding to the payment transaction or at least one of the future payment transactions:

receive, via the user interface of the first webpage, a transaction interaction with at least one screen of the sequence of screens, the transaction interaction comprises at least one of a plurality of swipe inputs comprising:
- a first swipe input in a first direction, the first swipe input indicative of approval of the payment transaction or at least one of the future payment transactions;
- a second swipe input in a second direction, the second swipe input indicative of deletion of the payment transaction or at least one of the future payment transactions;
- a third swipe input in a third direction, the third swipe input indicative of flagging the payment transaction or at least one of the future payment transactions; and
- a fourth swipe input in a fourth direction, the fourth swipe input indicative of revocation or reversal of the payment transaction or at least one of the future payment transactions; and in response to receiving the transaction interaction, cause, based on the at least one of the plurality of swipe inputs associated with the transaction interaction, the payment transaction or the at least one of the future payment transactions to be at least one of approved, deleted, revoked, reversed, or flagged for further review.

2. The payer computing system of claim 1, wherein the distributed API is deployed to the payer computing system without requiring installations.

3. The payer computing system of claim 1, wherein the first electronic payment request is an electronic invoice.

4. The payer computing system of claim 1, the instructions, when executed by the processing resource, causing the payer computing system to:
- receive, via an interface of the payer computing device, the first payer authentication information for the first biller computing system;
- based on the first payer authentication information, cause the first payer-biller electronic authentication token to be generated; and
- cause the first payer-biller electronic authentication token to be saved in the memory resource, wherein the first payer-biller electronic authentication token is stored relationally to the payer and the first biller.

5. The payer computing system of claim 4, wherein the first payer-biller electronic authentication token further comprises the first payer authentication information, and wherein the first payer authentication information is decodable by the first biller computing system.

6. The payer computing system of claim 5, wherein:
- the first payer-biller electronic authentication token further comprises a link to a biller-side API; and
- a portion of the first payer-biller electronic authentication token does not change when biller information, associated with the first biller and stored in the memory resource and comprising the link to the biller-side API, is changed.

7. The payer computing system of claim 1, the instructions, when executed by the processing resource, causing the payer computing system to:
- receive an electronic request to expire the first payer-biller electronic authentication token, wherein the request is received from one of the first biller computing system and the user interface of the first webpage; and
- in response to the request, marking the first payer-biller electronic authentication token as expired.

8. The payer computing system of claim 1, the instructions, when executed by the processing resource, causing the payer computing system to:
- generate a bill presentment request for the first biller, wherein the bill presentment request comprises the first payer-biller electronic authentication token; and
- cause a transmission of the bill presentment request, via the biller exchange computing system, to the first biller computing system.

9. The payer computing system of claim 1, the instructions, when executed by the processing resource, causing the payer computing system to:
- generate a payment quote request for the first biller, wherein the payment quote request comprises the first payer-biller electronic authentication token; and
- cause a transmission of the payment quote request, via the biller exchange computing system, to the first biller computing system,
- wherein the payment quote request comprises at least one of a balance inquiry, a due date inquiry, and a payment amount inquiry.

10. The payer computing system of claim 1, wherein the API is deployed at least in part on a computing device associated with an individual payee.

11. The payer computing system of claim 1, wherein the API is deployed at least in part on a computing device associated with a financial institution.

12. The payer computing system of claim 1, wherein the target account is managed by a receiving financial institution associated with the first biller computing system, the receiving financial institution being different from an originating financial institution that manages the source account.

13. The payer computing system of claim 1, wherein the API is deployed at least in part to the payer computing device and maintained by the biller exchange computing system separate from the payer computing device and the first biller computing system.

14. The payer computing system of claim 1, wherein the payment transaction comprises instructions transmitted to a clearance and settlement computing system.

15. The payer computing system of claim 1, wherein the first payer-biller electronic authentication token is an OAuth token.

16. The payer computing system of claim 15, wherein the first payer-biller electronic authentication token comprises an access scope specification.

17. The payer computing system of claim 1, wherein the payment transaction is a credit transfer message.

18. The payer computing system of claim 17, wherein the payment transaction is a PACS 008 message.

19. The payer computing system of claim 1, wherein the payment transaction is an ACH payment.

20. The payer computing system of claim 1, wherein the instructions, when executed by the processing resource, further cause the payer computing system to access, by the payer computing device via the first webpage, predictions of the future payment transactions generated based on data mining of historical payment transactions and trends, the predictions of the future payment transactions comprising at least one of payment amount predictions or due date predictions.

* * * * *